United States Patent
Sugeno et al.

(10) Patent No.: US 10,147,922 B2
(45) Date of Patent: *Dec. 4, 2018

(54) POWER STORAGE DEVICE, POWER STORAGE SYSTEM, ELECTRONIC APPARATUS, ELECTRIC VEHICLE, AND ELECTRIC POWER SYSTEM

(71) Applicant: MURATA MANUFACTURING CO., LTD., Kyoto (JP)

(72) Inventors: Naoyuki Sugeno, Fukushima (JP); Tsutomu Aoyama, Fukushima (JP); Tatsuya Adachi, Fukushima (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,070

(22) Filed: Jan. 24, 2018

(65) Prior Publication Data

US 2018/0175348 A1    Jun. 21, 2018

Related U.S. Application Data

(63) Continuation of application No. 14/900,842, filed as application No. PCT/JP2014/002624 on May 19, 2014, now Pat. No. 9,917,286.

(30) Foreign Application Priority Data

Jul. 2, 2013    (JP) ................................. 2013-138982

(51) Int. Cl.
   *B60L 1/00*    (2006.01)
   *H01M 2/10*    (2006.01)
   (Continued)

(52) U.S. Cl.
   CPC ......... *H01M 2/1077* (2013.01); *B60R 16/033* (2013.01); *H01G 11/10* (2013.01);
   (Continued)

(58) Field of Classification Search
   None
   See application file for complete search history.

(56) References Cited

U.S. PATENT DOCUMENTS 6,410,184 B1    6/2002  Horiuchi et al.
9,917,286 B2 *  3/2018  Sugeno ............... H01M 2/1077
   (Continued)

FOREIGN PATENT DOCUMENTS

EP    1 898 479    3/2008
EP    2 393 141    12/2011
   (Continued)

OTHER PUBLICATIONS

International Search Report issued in PCT1JP20141002624, dated Jul. 8, 2014 (2 pages).
Japanese Office Action (with English translation) dated Nov. 8, 2016 in corresponding Japanese application No. 2013-138982 (11 pages).
Extended EP Search Report dated Jul. 31, 2018 in corresponding European Application No. 18180575.5.

*Primary Examiner* — Cassandra Cox
(74) *Attorney, Agent, or Firm* — K&L Gates LLP

(57) ABSTRACT

A power storage device includes an outer casing and two battery units housed in the outer casing. Each battery unit includes a battery casing formed with a top casing and a bottom casing. The battery casing houses a battery block group in which battery lines are arranged in parallel in a direction substantially perpendicular to the battery line extending direction, and are arranged in a stacked straw bag arrangement, wherein the two or more battery units are vertically housed in the outer casing and are stacked in two or more stages in a horizontal direction, the bottom surface portions facing in the horizontal direction.

18 Claims, 29 Drawing Sheets

(51) Int. Cl.
  *H01M 10/42* (2006.01)
  *H01M 10/48* (2006.01)
  *H01G 11/10* (2013.01)
  *H01G 11/76* (2013.01)
  *H01G 11/82* (2013.01)
  *B60R 16/033* (2006.01)
  *H01M 2/20* (2006.01)
  *H02J 7/00* (2006.01)
  *H02J 7/34* (2006.01)
  *H02J 7/35* (2006.01)
  *H01M 10/0525* (2010.01)

(52) U.S. Cl.
  CPC ............ *H01G 11/76* (2013.01); *H01G 11/82* (2013.01); *H01M 2/206* (2013.01); *H01M 10/425* (2013.01); *H01M 10/482* (2013.01); *H02J 7/0013* (2013.01); *H02J 7/0042* (2013.01); *H02J 7/34* (2013.01); *H02J 7/35* (2013.01); *H01M 10/0525* (2013.01); *H01M 10/486* (2013.01); *H01M 2010/4278* (2013.01); *H01M 2220/10* (2013.01); *H01M 2220/20* (2013.01); *Y02E 10/766* (2013.01); *Y02E 60/122* (2013.01); *Y02E 60/13* (2013.01); *Y02T 10/7022* (2013.01); *Y02T 10/7055* (2013.01)

(56) References Cited

U.S. PATENT DOCUMENTS

| 2010/0047682 A1 | 2/2010 | Houchin-Miller et al. |
| 2013/0059182 A1 | 3/2013 | Komatsu |
| 2013/0181513 A1 | 7/2013 | Yano |

FOREIGN PATENT DOCUMENTS

| EP | 2 530 761 | 12/2012 |
| EP | 2 650 946 | 10/2013 |
| JP | 2000-306564 | 11/2000 |
| JP | 2005-285458 | 10/2005 |
| JP | 2006-216471 | 8/2006 |
| JP | 2010-146774 | 7/2010 |
| JP | 2011-154811 | 8/2011 |
| JP | 2011-154882 | 8/2011 |
| JP | 2011-154883 | 8/2011 |
| JP | 2011-154986 | 8/2011 |
| JP | 2011-175896 | 9/2011 |
| JP | 2013-073845 | 4/2013 |
| JP | 2013-235827 | 11/2013 |
| WO | 2010/150439 | 12/2010 |
| WO | 2011/093327 A1 | 8/2011 |
| WO | 2012/140728 A1 | 10/2012 |
| WO | 2013/077205 | 5/2013 |

\* cited by examiner

POWER STORAGE DEVICE, POWER STORAGE SYSTEM, ELECTRONIC APPARATUS, ELECTRIC VEHICLE, AND ELECTRIC POWER SYSTEM

CROSS-REFERENCES TO RELATED APPLICATIONS

The present application is a continuation of U.S. patent application Ser. No. 14/900,842 filed on Dec. 22, 2015, which is a national stage of International Application No. PCT/JP2014/002624 filed on May 19, 2014 and claims priority to Japanese Patent Application No. 2013-138982 filed on Jul. 2, 2013, the disclosures of which are incorporated herein by reference.

BACKGROUND

The present technology relates to a power storage device, a power storage system, an electronic apparatus, an electric vehicle, and an electric power system.

In recent years, use of secondary cells such as lithium-ion batteries has rapidly spread to power storage devices for storing electric power, storage batteries for vehicles, and the like, which are combined with new energy systems such as solar cells and wind power generation. So as to generate high power, a battery system to which one or more electric storage devices are connected is used. A power storage device is formed by housing one or more battery blocks in an outer casing, for example. A battery block is formed by connecting unit batteries (also referred to as electric cells or cells; hereinafter referred to simply as battery cells as appropriate) that are an example of power storage elements.

SUMMARY

In each power storage device, battery cells are expected to be appropriately positioned and secured to achieve a higher energy density.

In view of this, the present technology aims to provide a power storage device that can increase energy density, and a power storage system, an electronic apparatus, an electric vehicle, and an electric power system that use the power storage device.

To solve the above problem, the present technology provides a power storage device that includes:
an outer casing; and
two or more battery units housed in the outer casing,
the battery units each including:
a battery casing formed with a top casing having one or more first holes formed in a bottom surface portion thereof and a bottom casing having one or more second holes formed in a bottom surface portion thereof;
a battery block group housed in the battery casing, battery lines formed with battery cells arranged in lines are arranged in parallel in a direction substantially perpendicular to the extending direction of the battery lines, and are arranged like stacked straw bags; and
a partition plate housed together with the battery block group in the battery casing, the partition plate being inserted between adjacent ones of the battery lines facing each other, one or more first protrusions being formed on the upper surface of the partition plate, one or more second protrusions being formed on the lower surface of the partition plate, the one or more first protrusions being engaged with the one or more first holes, the one or more second protrusions being engaged with the one or more second holes.

A power storage system, an electronic apparatus, an electric vehicle, and an electric power system according to the present technology each include the above described power storage device.

Additional features and advantages are described herein, and will be apparent from the following Detailed Description and the figures.

According to the present technology, the energy density of power storage devices can be effectively increased.

DETAILED DESCRIPTION

Figure 1:
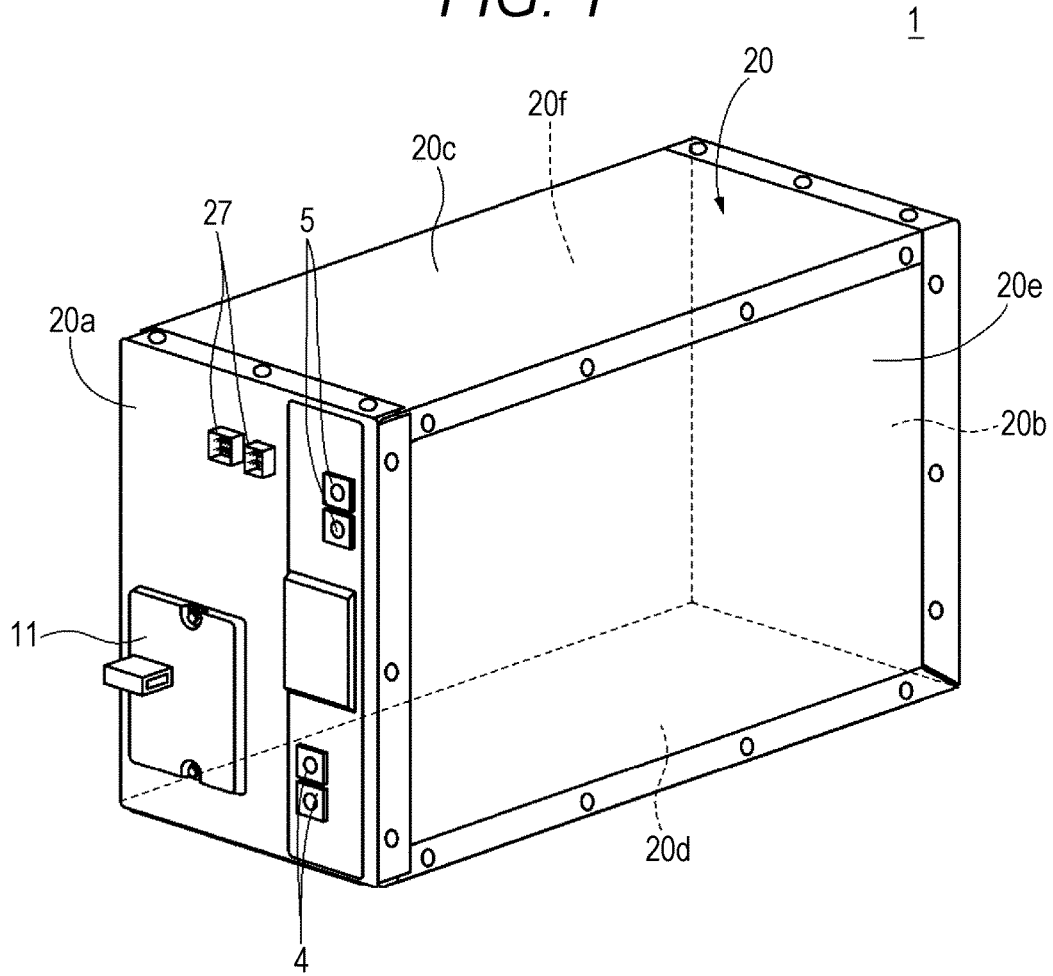
FIG. 1 is a perspective view of the exterior of a power storage device.

The following is a description of embodiments of the present technology, with reference to the drawings. Explanation will be made in the following order. Throughout all drawings of the embodiments, like or similar components are denoted by like reference numerals.

1. First embodiment (a first example of a power storage device)
2. Second embodiment (a second example of a power storage device)
3. Other embodiments (modifications)
4. Applications It should be noted that the embodiments and the like described below are preferred specific examples of the present technology, and the contents of the present technology are not limited to those embodiments and the like.

Also, the effects disclosed in this specification are merely examples and are not restrictive, and do not negate the existence of different effects from those examples of effects disclosed herein.

1. First Embodiment (Example Structure of a Power Storage Device)

Figure 2:
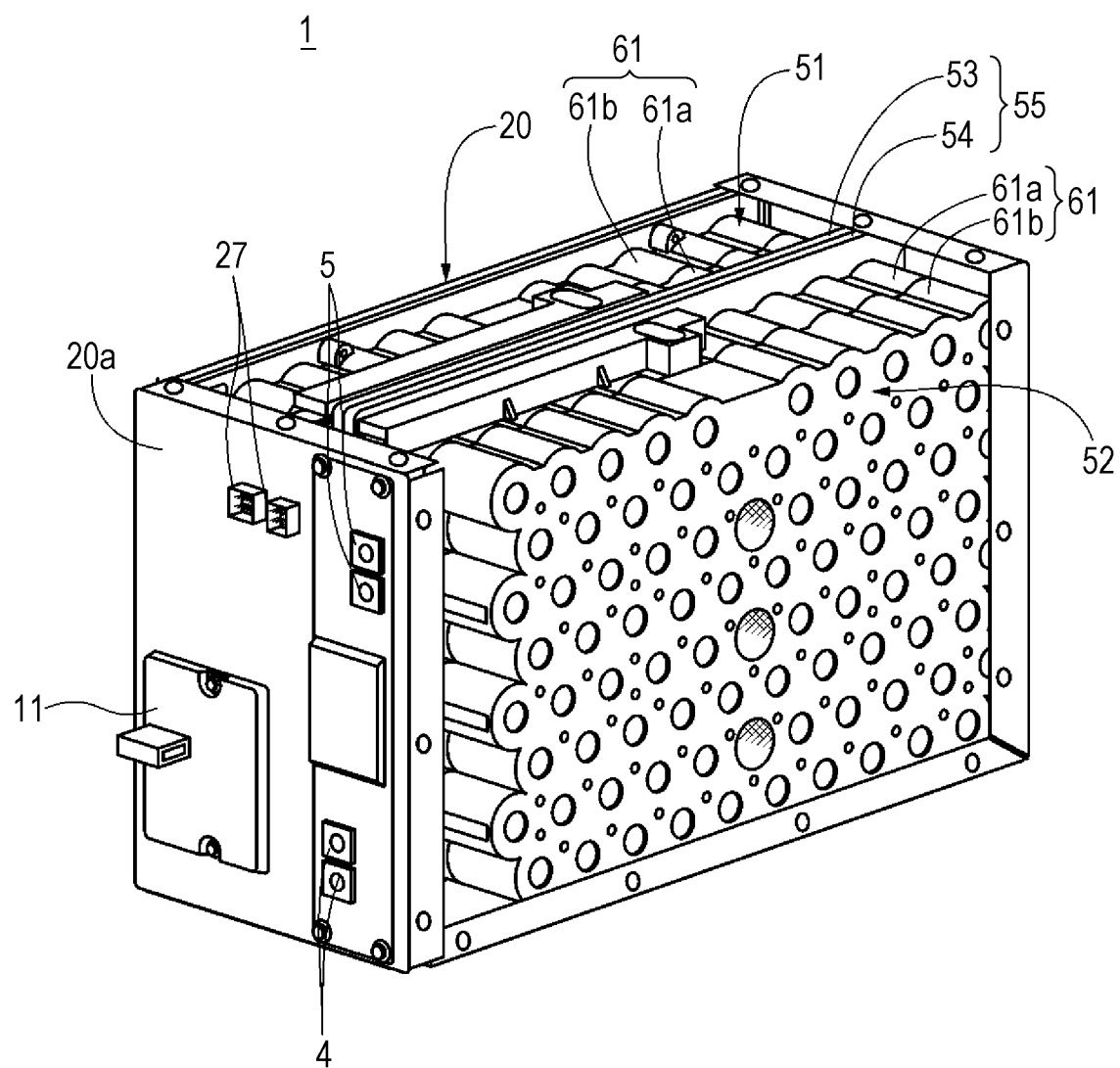
FIG. 2 is a perspective view of the power storage device minus its top panel and side panel on the front side.
Figure 3:
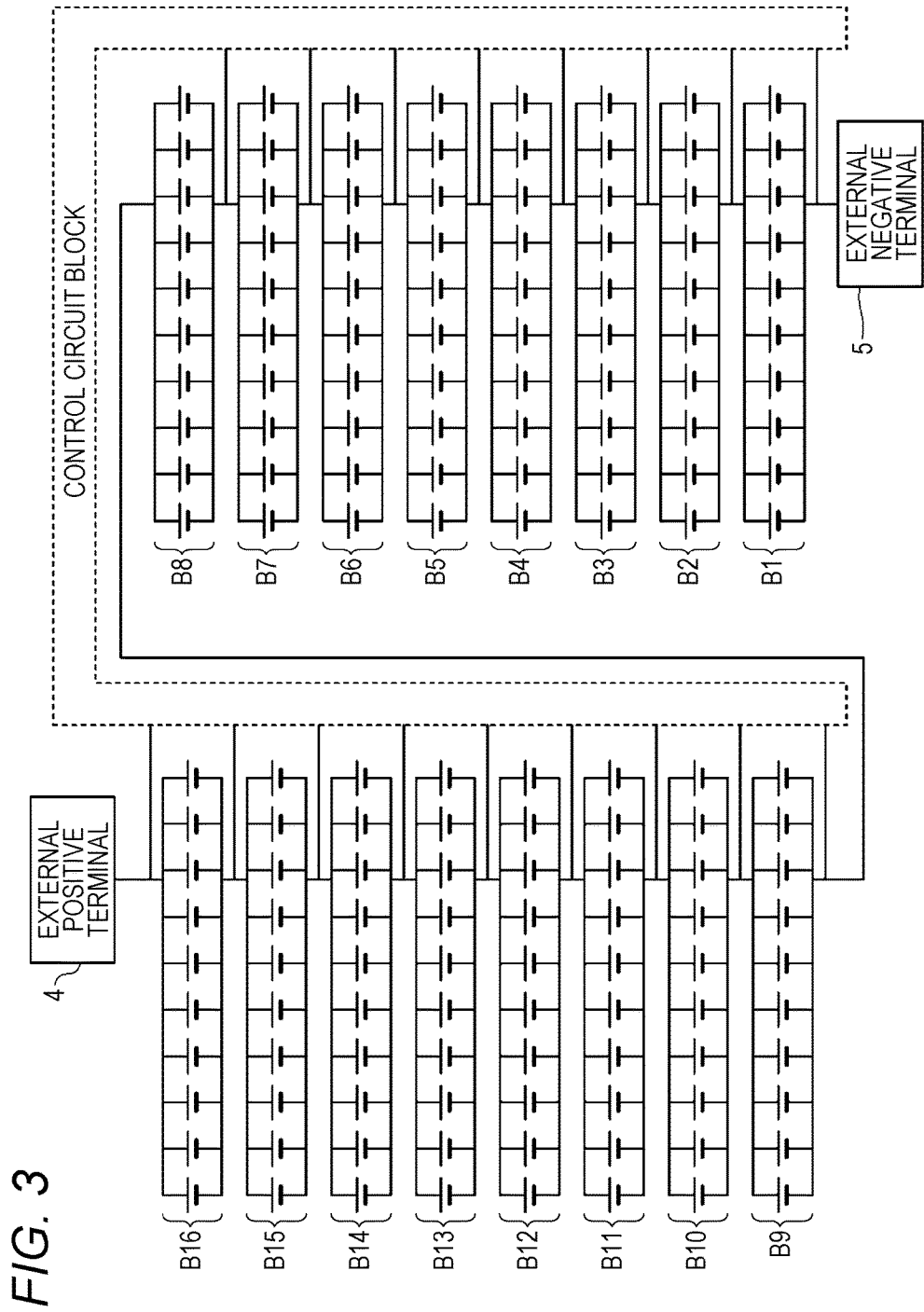
FIG. 3 is a block diagram schematically showing the electrical structure of a power storage device according to a first embodiment of the present technology.
Figure 4:
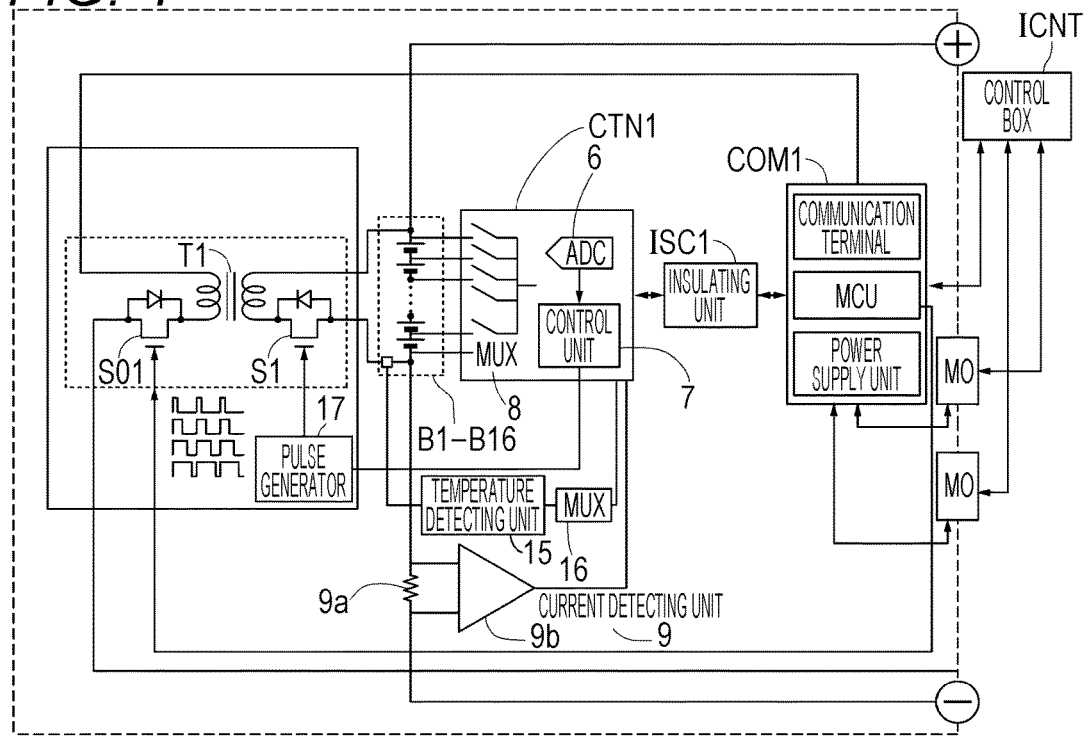
FIG. 4 is a block diagram showing an example electrical structure of the power storage device according to the first embodiment of the present technology.
Figure 5:
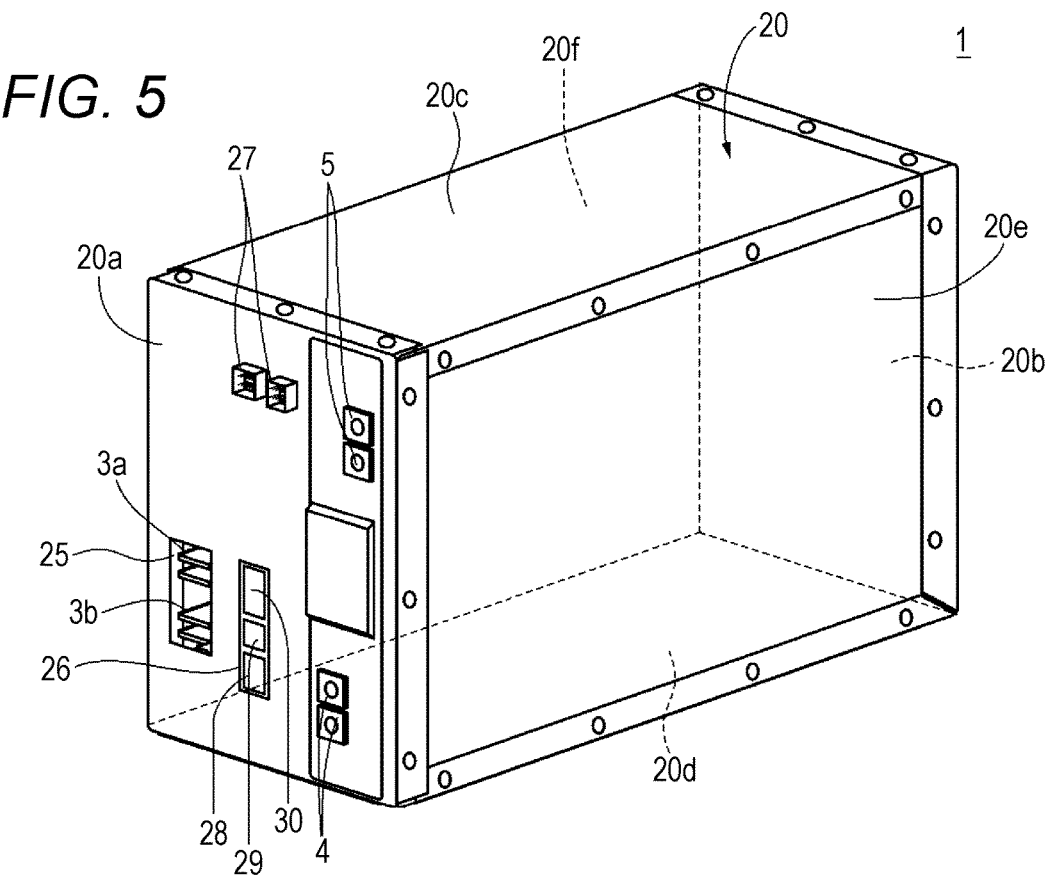
FIG. 5 is a perspective view of the exterior of the power storage device, with the short bar removed.
Figure 6:
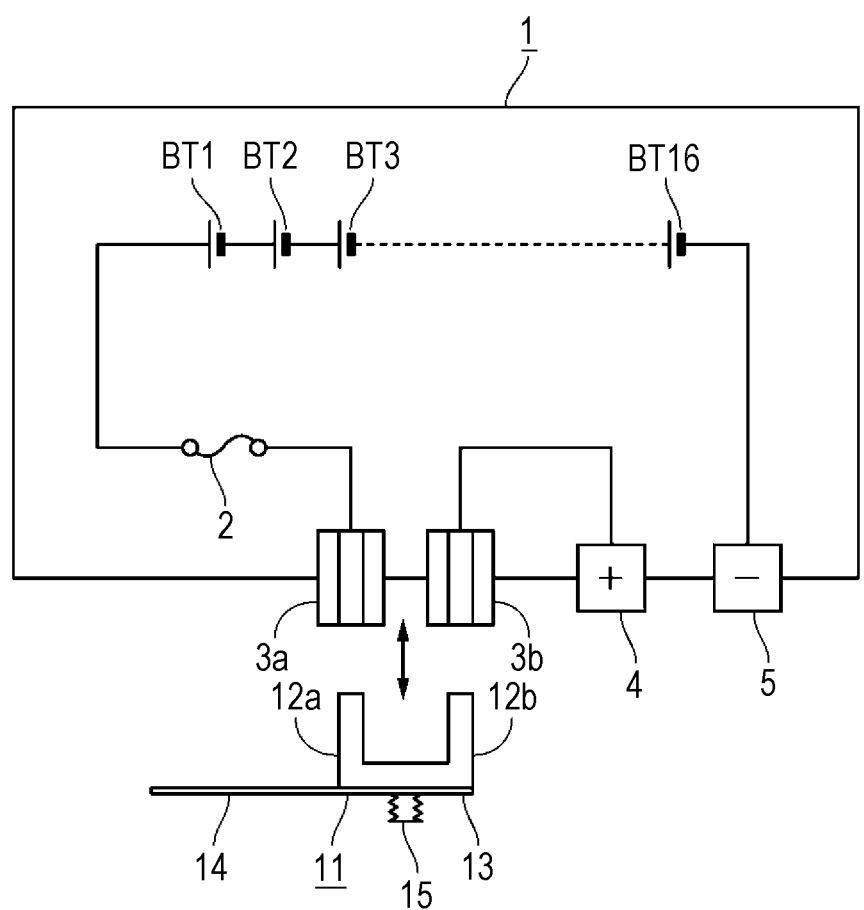
FIG. 6 is a block diagram schematically showing the electrical structure of the power storage device according to the first embodiment of the present technology.

An example structure of a power storage device according to a first embodiment of the present technology is now described, with reference to drawings. FIG. 1 is a perspective view of the exterior of the power storage device. FIG. 2 is a perspective view of the power storage device minus its top panel and side panel on the front side. FIG. 3 schematically shows the electrical structure of the power storage device according to the first embodiment of the present technology. FIG. 4 schematically shows the electrical structure of the power storage device according to the first embodiment of the present technology. FIG. 5 shows the exterior of the power storage device, with the short bar removed. FIG. 6 schematically shows the electrical structure of the power storage device according to the first embodiment of the present technology.

As shown in FIG. 1, the power storage device 1 includes an outer casing 20. The outer casing 20 is a housing that is substantially in the form of a rectangular parallelepiped, and is formed with a front panel 20a, a back panel 20b, a top panel 20c, a bottom panel 20d, and two side panels 20e and 20f.

As shown in FIG. 2, the outer casing 20 of the power storage device 1 houses a battery unit 51 and a battery unit 52, an insulating member 55 interposed between the battery unit 51 and the battery unit 52, a circuit board (not shown in FIG. 2) having a control circuit block and the like mounted thereon, and the like. Each of the battery unit 51 and the battery unit 52 is formed by housing a battery block group and members such as tabs electrically connecting battery cells in a battery casing 61 formed with a top casing 61a and a bottom casing 61b joined to each other. The battery block group is formed with battery blocks connected in series, for example, and each one battery block is formed with battery cells connected in parallel. The battery cells are secondary cells such as cylindrical lithium-ion secondary cells. However, the battery cells are not limited to lithium-ion secondary cells.

For example, the battery unit 51 and the battery unit 52 are vertically housed in the outer casing 20 so that the bottom surface portion and the top surface portion of each top casing 61a face in the horizontal direction, and the two battery units are stacked in the horizontal direction.

As shown in FIG. 3, the battery unit 51 and the battery unit 52 are housed in such a manner that battery blocks B1 through B16 each formed with 10 battery cells connected in parallel are connected in series, for example. A battery block group formed with the battery blocks B1 through B8 is housed in the battery unit 51. A battery block group formed with the battery blocks B9 through B16 is housed in the battery unit 52. However, the number of battery cells constituting each battery block is not limited to 10, and the number of battery blocks constituting each battery block group is not limited to the above, either.

In the battery unit 51 and the battery unit 52, tabs that are members having electrical conductivity for connection are used for connecting the battery cells or battery blocks in series or parallel. For example, the tabs are plate-like members made of a material such as a metal having electrical conductivity.

Each of the battery blocks B1 through B16 is connected to the control circuit block (hereinafter referred to as the control block), so that charging and discharging thereof is controlled. The charging and discharging are performed through an external positive terminal 4 and an external negative terminal 5. A single power storage device 1 outputs (16×3.2 V=51.2 V), for example.

So as to monitor the voltages, currents, and temperatures of the battery cells, the control block is provided in the power storage device 1. Information from the control block is transmitted to an external controller through communication. The external controller performs control such as charge control, discharge control, and degradation restraint. For example, the control block monitors the voltage of each battery block, converts a detected voltage into a digital signal, and transmits the digital signal to a control box ICNT that is the external controller. A voltage may be applied to each battery block to detect the temperature thereof, the detected temperature may be converted into digital data, and the digital data may be transmitted to the control box ICNT.

FIG. 4 shows an example of the control block. As shown in FIG. 4, the control block is designed to detect the voltages of both ends of the 16 battery blocks B1 through B16 connected in series, and detect the voltages of the respective battery blocks. A multiplexer 8 (MUX 8) that sequentially outputs the voltages of both ends of the battery blocks B1 through B16 and the voltages of the respective battery blocks is provided.

The MUX 8 switches channels in accordance with a predetermined control signal, for example, and selects one piece of analog voltage data from among n pieces of analog voltage data. The one piece of analog voltage data selected by the MUX 8 is supplied to an AD converter (ADC (Analog to Digital Converter) 6).

The ADC 6 converts the analog voltage data supplied from the MUX 8 into digital voltage data. For example, the analog voltage data is converted into 14- to 18-bit digital voltage data. The digital voltage data from the ADC 6 is supplied to a communication unit COM1. The communication unit COM1 is controlled by a control unit 7, and conducts communication with an external device connected thereto through a communication terminal. For example, the communication unit COM1 conducts communication with another power storage device MO through a communication terminal, and conducts communication with the control box ICNT through a communication terminal. The communication unit COM1 further receives a control signal from the control box ICNT through a communication terminal. In this manner, the communication unit COM1 conducts bidirectional communication.

Further, the control unit 7 controls equalizing of the voltages of the battery blocks B1 through B16. This control is called cell balance control. In a case where one battery block among the battery blocks B1 through B16 reaches the lower-limit discharge voltage for use, for example, there are the other battery blocks with remaining battery charge. When the next charging is performed, the other battery blocks with the remaining battery charge reach the upper-limit charging voltage in a short time, and the charging cannot be continued until full charge. To avoid such imbalance, a MOSFET (Metal Oxide Semiconductor Field Effect Transistor) is switched on, to forcibly cause the battery blocks with remaining battery charge to discharge. The cell balance control method is not limited to the above described passive method, and may be an active method or any of the other various methods.

A control pulse for a switch (MOSFET) S1 on the primary side of a flyback transformer T1 of a module balance control circuit that controls the voltage balance between the power storage device 1 and power storage devices MO is supplied from a pulse generator 17. The pulse generator 17 generates a control pulse in accordance with a control signal from the control unit 7 of a module controller CTN1. For example, the pulse generator 17 generates a control pulse having a modulated pulse width. A control pulse for a switch (MOSFET) S01 on the secondary side of the flyback transformer T1 is supplied from an MCU (MicroController Unit) in the communication unit COM1.

The control box ICNT determines the sequence in the balance among the power storage devices in accordance with voltage information about the respective power storage devices 1 and the power storage devices MO. Information about the presence or absence of charge and discharge of the balance among the power storage devices is transmitted to the MCU of each power storage device. The MCU supplies a control signal directly to the secondary side of the flyback transformer, or transmits a control signal to the primary side of the flyback transformer T1 through insulated communication via an insulating unit ISC1.

A temperature detecting unit 15 is formed with a temperature detecting element such as a thermistor. Analog temperature data T indicating the respective temperatures of the battery blocks B1 through B16 detected by the temperature detecting unit 15 are supplied to a cell temperature multiplexer 16 (MUX 16). For example, analog temperature data T1 indicating the temperature of the battery block B1 is supplied to the MUX 16. Analog temperature data T2 indicating the temperature of the battery block B2 is supplied to the MUX 16. Likewise, analog temperature data T3 through T16 indicating the respective temperatures of the battery blocks B3 through B16 are supplied to the MUX 16.

The MUX 16 switches channels in accordance with a predetermined control signal, and selects one piece of analog temperature data T from among the 16 pieces of analog temperature data T1 through T16. The one piece of analog temperature data T selected by the MUX 16 is then supplied to the ADC 6.

A current detecting unit 9 detects the value of the current flowing in the battery blocks B1 through B16. The current detecting unit 9 is formed with a current detecting resistor 9a and a current detecting amplifier 9b, for example. Analog current data indicating the voltage values at both ends of the current detecting resistor 9a is detected by the current detecting resistor 9a. Analog current data is constantly detected, regardless of whether charging is being performed or whether discharging is being performed. Analog current data may be detected at predetermined intervals.

The detected analog current data is supplied to the current detecting amplifier 9b. The supplied analog current data is amplified by the current detecting amplifier 9b. The amplified analog current data is supplied to the ADC 6.

The ADC 6 converts the analog current data supplied from the current detecting amplifier 9b into digital current data. The ADC 6 converts the analog current data into digital current data, and outputs the digital current data.

For example, in a case where an excess current flow is detected in the module controller CTN1 at a time of discharging, the present state is determined to be a discharging excess current state, and a switch (not shown) is controlled to enter an opened state (a current blocking state). In a case where an excess current flow is detected at a time of charging, on the other hand, the switch (not shown) is controlled to enter an opened state (a current blocking state).

The insulating unit ISC1 has the function to insulate the communication unit COM1 and the module controller CTN1 from each other. That is, the reference potential of the power supply to the communication unit COM1 and the reference potential of the power supply to the module controller CTN1 are separated from each other, and become independent of each other. Further, in an insulated state, the insulating unit ISC1 has the function to supply a power-supply voltage to the module controller CTN1, and the function as a transmission medium for bidirectional communication.

The method of bidirectional communication to be conducted through the insulating unit ISC1 may be a method compliant with the CAN standards. The method of power transmission to be conducted through the insulating unit ISC1 may be an electromagnetic induction method, a magnetic field resonance method, a radio wave reception method, or the like.

In the first embodiment, a non-contact IC card technique is used, for example. By the non-contact IC card technique, the magnetic flux of the antenna coil of a reader/writer is coupled to the magnetic flux of the antenna coil of a card, and communication and power transmission are conducted between the reader/writer and the card. As the communication, the method of ASK (Amplitude Shift Keying)-modulating the carrier waves at the frequency of 13.56 kHz, and communication is conducted at a rate of 212 or 424 kbps. The insulating unit ISC1 is designed to be compatible with the above described non-contact IC card technique. Further, the insulating unit ISC1 is designed to conduct communication and power transmission between antennas (coils) formed in different layers of a multilayer printed circuit board, for example.

(Front Surface of the Power Storage Device)

On the front surface of the power storage device 1, the external positive terminal 4 and the external negative terminal 5 for charging and discharging of the power storage device 1 are provided. For example, the external positive terminal 4 and the external negative terminal 5 are preferably arranged so as not to overlap each other in the vertical direction. This is because, when connecting members for connecting to another power storage device are connected to the external positive terminal 4 and the external negative terminal 5, the connecting members can be prevented from overlapping each other.

As shown in FIG. 5, windows 25 and 26 positioned close to each other are further formed in the front panel 20a of the power storage device 1. A connector 27 that is a communication terminal for communicating with an external controller is further provided on the front surface of the power storage device 1. As described above, the control block that monitors the voltages, currents, and temperatures of the battery cells is provided in the power storage device 1. Information from the control block is transmitted to the external controller through communication. The external controller performs control such as charge control, discharge control, and degradation restraint.

As the communication with the external controller via the connector 27, a serial interface is used, for example. Specifically, an SM bus (System Management bus) or the like is used as the serial interface. For example, it is possible to use an I2C bus. An I2C bus is synchronous serial communication for conducting communication with two signal lines of SCL (serial clock) and bidirectional SDA (serial data).

Connectors 3a and 3b are provided to stand inside the window 25 formed in the front panel 20a.

As shown in FIG. 6, the terminals on the positive sides of the battery blocks B1 through B16 connected in series are connected to the connector 3a via a fuse 2 that is a current breaking element. The other connector 3b is provided near the connector 3a. The connector 3b is connected to the external positive terminal 4. The terminals on the negative sides of the battery blocks B1 through B16 are connected to the external negative terminal 5.

A short bar 11 that can be inserted and detached as a connecting unit into and from the connectors 3a and 3b. The short bar 11 has a structure that is formed by bending a conductive plate so as to have a pair of plate-like protrusions 12a and 12b, and attaching the base of the conductive plate to one surface of a supporting plate 13. As one end of the supporting plate 13 is extended, a cover 14 is formed. Further, a knob 15 is formed on the other surface of the supporting plate 13. The supporting plate 13 having the cover 14 and the knob 15 is a molded item of synthetic resin, for example.

The connectors 3a and 3b each have two spring contact plates facing each other, so that the plate-like protrusion 12a or 12b of the short bar 11 is inserted into the space between the two spring contact plates through the window 25. Further, the window 26 is blocked by the cover 14 integral with the supporting plate 13 of the short bar 11. Since each of the plate-like protrusions 12a and 12b is interposed by the two spring contact plates of each corresponding one of the connectors 3a and 3b, the short bar 11 can be kept inserted in the connectors 3a and 3b.

As the plate-like protrusions 12a and 12b of the short bar 11 are inserted into the spaces of the respective connectors, the connector 3a and the connector 3b are connected (are made conductive) by the short bar 11. When the plate-like protrusions 12a and 12b of the short bar 11 are pulled out of the spaces of the respective connectors, on the other hand, the connector 3a and the connector 3b are disconnected (are made non-conductive). In this manner, it is possible to switch between a connected state where the short bar 11 is inserted into the connectors 3a and 3b, and an unconnected state where the short bar 11 is pulled out of the connectors 3a and 3b.

Electronic components for setting or connection are provided inside the window 26 formed in the front panel 20a. The electronic components are formed with a sliding switch 28, a rotary switch 29, and a JTAG connector 30, for example. An address is set for the power storage device 1 with the rotary switch 29. Specifically, in a case where power storage devices 1 can be connected for use, and power storage devices 1 are actually connected, identification addresses are set for the respective power storage devices. The external controller performs control processing based on these addresses. The sliding switch 28 is used for increasing the addresses that can be designated with the rotary switch 29.

The JTAG connector 30 is a standard connector suggested by JTAG (Joint European Test Action). Test data for testing an MPU (Micro Processing Unit), an IC (Integrated Circuit), and the like in the casing is input through the JTAG connector 30, and the firmware of the internal MPU is rewritten through the JTAG connector 30. Components other than the above described elements, such as a switching component and a connector, may be used as the electronic components.

In a connected state where the short bar 11 is inserted in the connectors 3a and 3b, the cover 14 blocks the windows 25 and 26 in front of the operating surfaces of the electronic components. That is, in a connected state, access to the electronic components is prohibited. When the short bar 11 is pulled out of the connectors 3a and 3b, on the other hand, the windows in front of the operating surfaces of the setting units are opened, and the operating surfaces are operated through the windows 25 and 26 so that an address of the power storage device 1 can be set, for example.

Only when the short bar 11 is removed, and the windows 25 and 26 in front of the operating surfaces are opened, is access to the operating surfaces allowed, and can the setting operation be performed with the electronic components. As the setting operation is performed from outside the outer casing 20, higher workability than that in a case where the electronic components are operated inside the casing can be achieved, and security can be increased.

(Material of the Outer Casing)

A material having a high heat conductivity and a high radiation factor is preferably used as the material of the outer casing 20. That is, a material having a high heat conductivity and a high radiation factor is used for the front panel 20a, the back panel 20b, the top panel 20c, the bottom panel 20d, and the two side panels 20e and 20f. With this, excellent housing heat release properties can be achieved, and increases in the temperature in the outer casing 20 can be restrained. For example, the plate-like member forming the outer casing 20 is a metal plate made of aluminum or an aluminum alloy, copper or a copper alloy, or the like.

(Side Panels of the Outer Casing)

The side surface on the front side of the outer casing 20 is formed with the side panel 20e, and the side surface on the back side is formed with the side panel 20f. The side panel 20e and the side panel 20f are rectangular plate-like members, for example. As described above, the rectangular plate-like members are preferably metal plates or the like made of a metal material such as aluminum.

Figure 7:
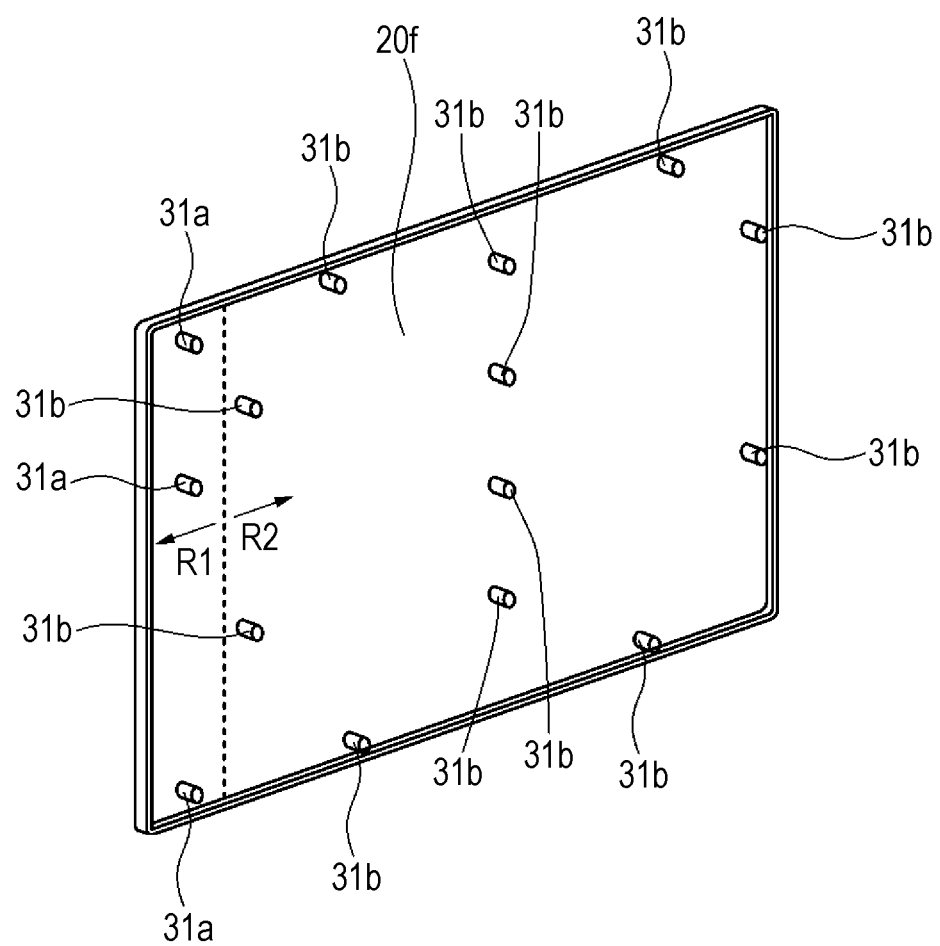
FIG. 7 is a perspective view of an example structure of a side panel.

As shown in FIG. 7, the side panel 20f is divided by the dotted line into a circuit board region R1 in which the circuit board is placed, and a battery unit region R2 in which the battery unit 51 is placed. Protrusions 31a for positioning and securing the circuit board, and protrusions 31b for positioning and securing the battery unit 51 are provided on the principal surface on the inner side of the side panel 20f. The protrusions 31a are provided in a line in the vertical direction in the circuit board region R1, for example. The protrusions 31b are provided at peripheral portions of the battery unit region R2. The protrusions 31b are also provided in a line in the vertical direction almost at the center of the battery unit region R2.

Although not shown in the drawings, protrusions 31a for positioning and securing the circuit board, and protrusions 31b for positioning and securing the battery unit 52 are also provided at predetermined positions on the principal surface on the inner side of the side panel 20e. On the side panel 20e, the protrusions 31a are also provided in a line in the vertical direction in the circuit board region R1, for example. The protrusions 31b are provided at peripheral portions of the battery unit region R2, for example. The protrusions 31b are also provided in a line in the vertical direction almost at the center of the battery unit region R2.

Figure 8A:
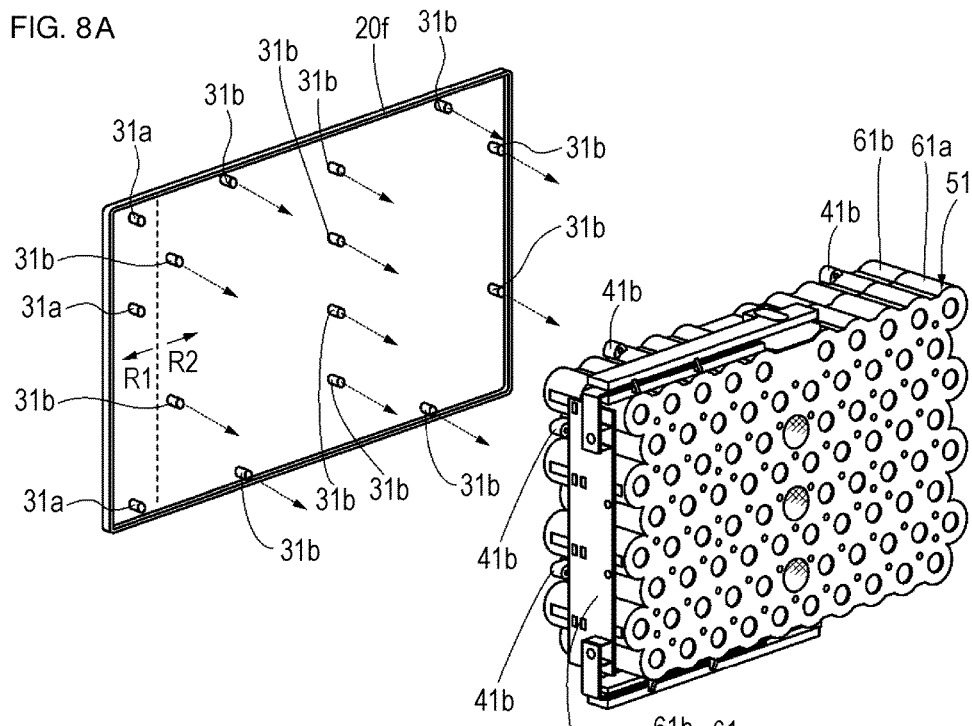
FIG. 8A is a perspective view of an example structure prior to attaching of a battery unit to a side panel.
Figure 8B:
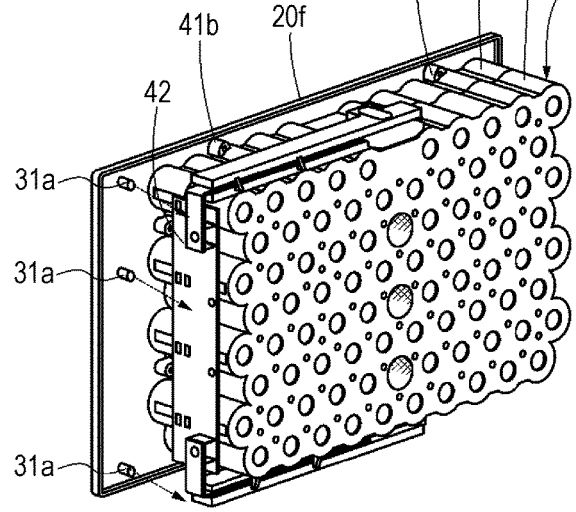
FIG. 8B is a perspective view of an example structure in which the battery unit is secured to the side panel.

As shown in FIGS. 8A and 8B, the battery unit 51 is placed in the battery unit region R2 of the side panel 20f. At this point, the protrusions 31b are engaged with holes 41b in the corresponding positions in the bottom casing 61b, so that the battery unit 51 is secured in a predetermined position on the side panel 20f. Although not shown in the drawings, after the protrusions 31b are engaged with the holes 41b, clamping may be performed with screws as necessary.

Specifically, the eight protrusions 31b provided at peripheral portions of the battery unit region R2 are engaged with eight holes 41b provided at peripheral portions of the bottom surface portion of the bottom casing 61b (though some of the holes 41b are not shown in the drawings). The four protrusions 31b arranged almost at the center of the battery unit region R2 are engaged with the holes (not shown) formed in the bottom surfaces of hollow structural portions arranged in a line in the bottom casing 61b, and clamping is performed with screws as necessary, so that the battery unit 51 is secured in a predetermined position on the side panel 20f.

Further, a fuse board 43 on which a circuit including the fuse 2 and the connectors 3a and 3b is mounted is positioned and secured to the side panel 20f on which the battery unit 51 shown in FIG. 8B has already been positioned and secured. The protrusions 31a of the side panel 20f are engaged with holes 41a formed in the corresponding positions on the fuse board 43, so that the fuse board 43 is secured in a predetermined position on the side panel 20f as shown in FIG. 9A.

It should be noted that a sub board 42 is secured to the battery unit 51. For example, as shown in FIG. 9B, the sub board 42 is positioned and secured so that a principal surface of the sub board 42 faces the wall surface perpendicular to the extending direction of the battery lines among the four wall surfaces of the battery casing 61, and part of the principal surface is in close contact with the wall surface. Accordingly, the unnecessary space for positioning the sub board 42 can be reduced.

Screw terminal portions 42a1 are provided at both ends of the sub board 42. End portions of connecting bars 98 that have a plate-like form and are partially bent at right angle, and are joined to tabs 91a, are joined to the screw terminal portions 42a1 of the sub board 42.

Figure 9A:
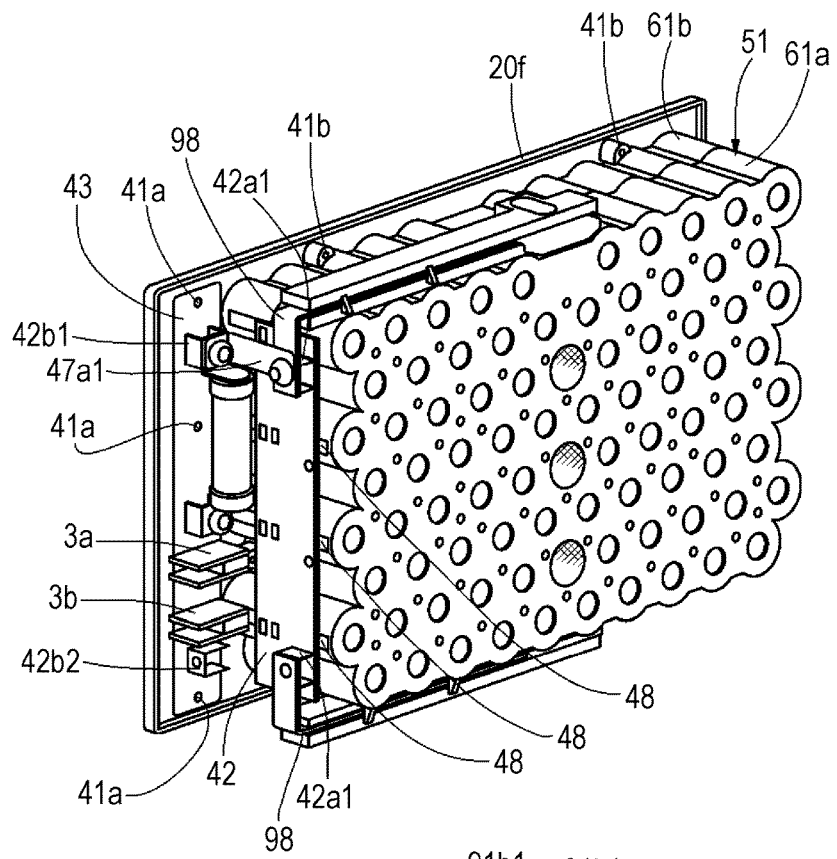
FIG. 9A is a perspective view of an example structure in which a battery unit and a fuse board are secured to a side panel.
Figure 9B:
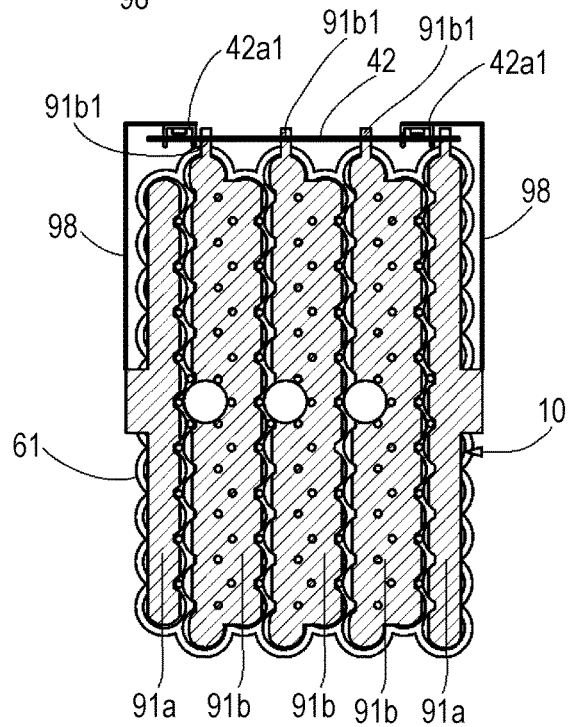
FIG. 9B is a plan view of a battery unit having a battery casing to which a sub board is secured.

As shown in FIG. 9A, openings 48 through which protruding end portions 91b1 of tabs are guided are provided in a wall surface of the battery casing. The rectangular protruding end portions 91b1 of three tabs 91b pass through the openings 48 in one wall surface, and are stuck directly into and thus connected to the upper portion of the sub board 42. Although not shown in the drawings, the protruding end portions 91b1 of tabs 91b provided on the lower surface side of the battery block group 10 also pass through the openings 48 on one wall surface, and are stuck directly into and thus connected to the lower end portion of the sub board 42.

With this structure being employed, the members (such as lead wires) for connecting the respective battery blocks B1 through B8 to the sub board 42 do not need to be provided.

Referring back to FIG. 9A, one end of a connecting member 47a1 is joined to a screw terminal portion 42a1 of the sub board 42, and the other end is joined to a screw terminal portion 42b1 of the fuse board 43, so that the sub board 42 and the fuse board 43 are electrically connected via the connecting member 47a1. The connecting member 47a1 is a plate-like member or the like made of a metal material having electrical conductivity, for example. (It should be noted that the connecting members 47a2 and 47a3 described below are the same as the connecting member 47a1.)

Figure 10:
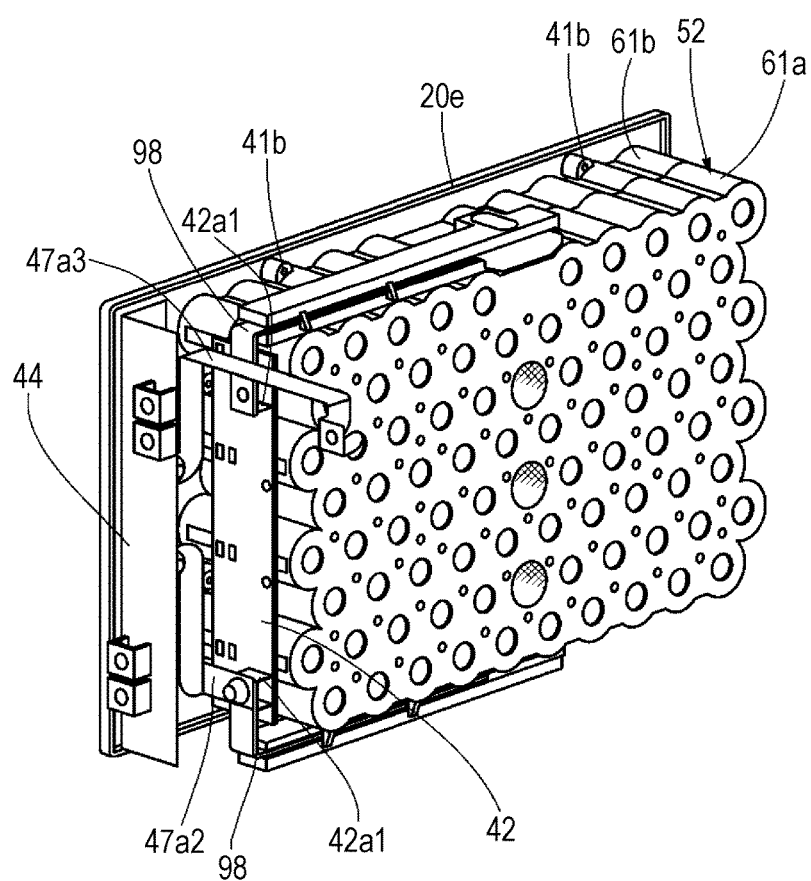
FIG. 10 is a perspective view of an example structure in which a battery unit and an output terminal board are secured to a side panel.

The battery unit 52 and an output terminal board 44 on which a circuit including output terminals is mounted are positioned and secured in predetermined positions on the side panel 20e in the same manner as with the side panel 20f. FIG. 10 is a perspective view of the battery unit 52 and the output terminal board 44 positioned and secured in predetermined positions on the side panel 20e.

As shown in FIG. 10, the protrusions 31b (not shown) provided on the side panel 20e are engaged with the respective holes 41b formed in the corresponding positions in the bottom casing 61b (some of the holes are not shown in the drawing), so that the battery unit 52 is secured in a predetermined position on the side panel 20e. The protrusions 31a formed on the side panel 20e are engaged with the respective holes (not shown) formed in the corresponding positions in the output terminal board 44, so that the output terminal board 44 is secured in a predetermined position on the side panel 20e.

It should be noted that the sub board 42 is secured to the battery unit 52 in the same manner as with the battery unit 51. Also, one end of the connecting member 47a2 is joined to a screw terminal portion 42a1 of the sub board 42, and the other end is joined to output terminal board 44, so that the sub board 42 and the output terminal board 44 are electrically connected via the connecting member 47a2. The connecting member 47a3 having one end joined to the output terminal board 44 has the other end joined to a screw terminal portion 42b2 (shown in FIG. 9A) of the fuse board 43, so that the output terminal board 44 and the fuse board 43 are electrically connected via the connecting member 47a3. (The connected state is shown in FIG. 11, which will be described later).

Figure 11:
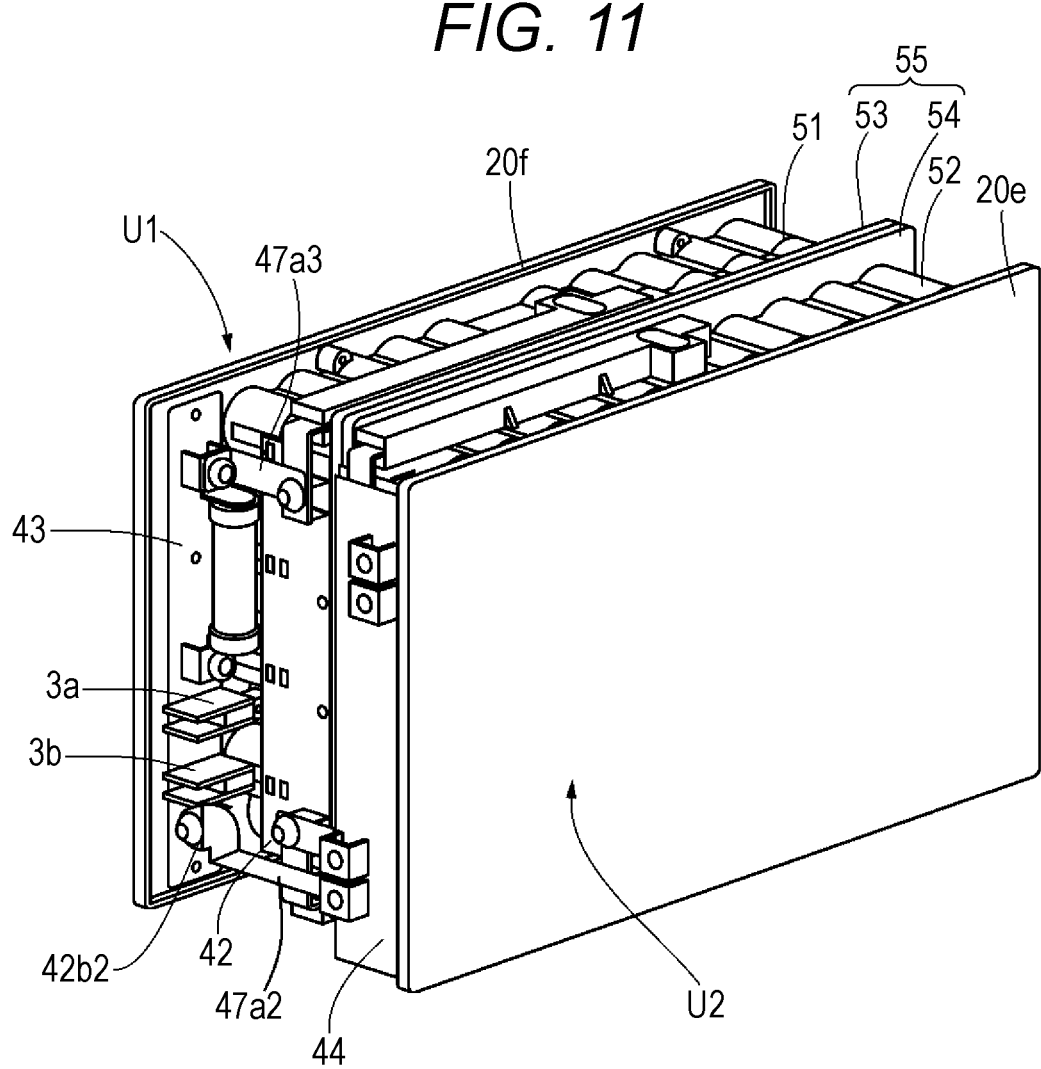
FIG. 11 is a perspective view of an example structure of an outer casing minus its front panel and back panel.

FIG. 11 is a perspective view of the power storage device minus its front panel, back panel, top panel, and bottom panel. As shown in FIG. 11, an assembled unit U1 and an assembled unit U2 face each other via the insulating member 55. The assembled unit U1 is formed by securing the battery unit 51 having the sub board 42 secured thereto and the fuse board 43 to the side panel 20f. The assembled unit U2 is formed by securing the battery unit 52 having the sub board 42 (not shown) secured thereto and the output terminal board 44 to the side panel 20e.

(Insulating Member)

The insulating member 55 is provided to maintain insulation properties between the two battery units 51 and 52 facing each other, or to further improve the insulation properties. The insulating member 55 is interposed between the two battery units 51 and 52 facing each other. The insulating member 55 is formed with two rectangular resin plates 53 and 54 that are in close contact with each other, for example. The resin plate 53 is placed on the bottom surface portion of the top casing 61a of the battery unit 51, for example. The resin plate 54 is placed on the bottom surface portion of the top casing 61a of the battery unit 52.

The insulating member 55 may be formed with a single resin plate. The insulating member 55 may be a stack structure formed with three or more resin plates. Alternatively, the insulating member 55 may be a stack structure formed with resin plates and a metal plate, with the metal plate being interposed between two resin plates, for example. In this case, high insulation properties can be maintained, and heat release properties can be further improved.

In a case where the openings through which tabs are exposed in the battery unit 51 are covered with another insulating member, high insulation properties between the battery unit 51 and the battery unit 52 are maintained, and therefore, a member with high heat release properties (a metal plate such as an Al plate), instead of the insulating member 55, may be provided. In this case, the heat release properties of the power storage device 1 can be further improved.

(Resin Plates)

Figure 12:
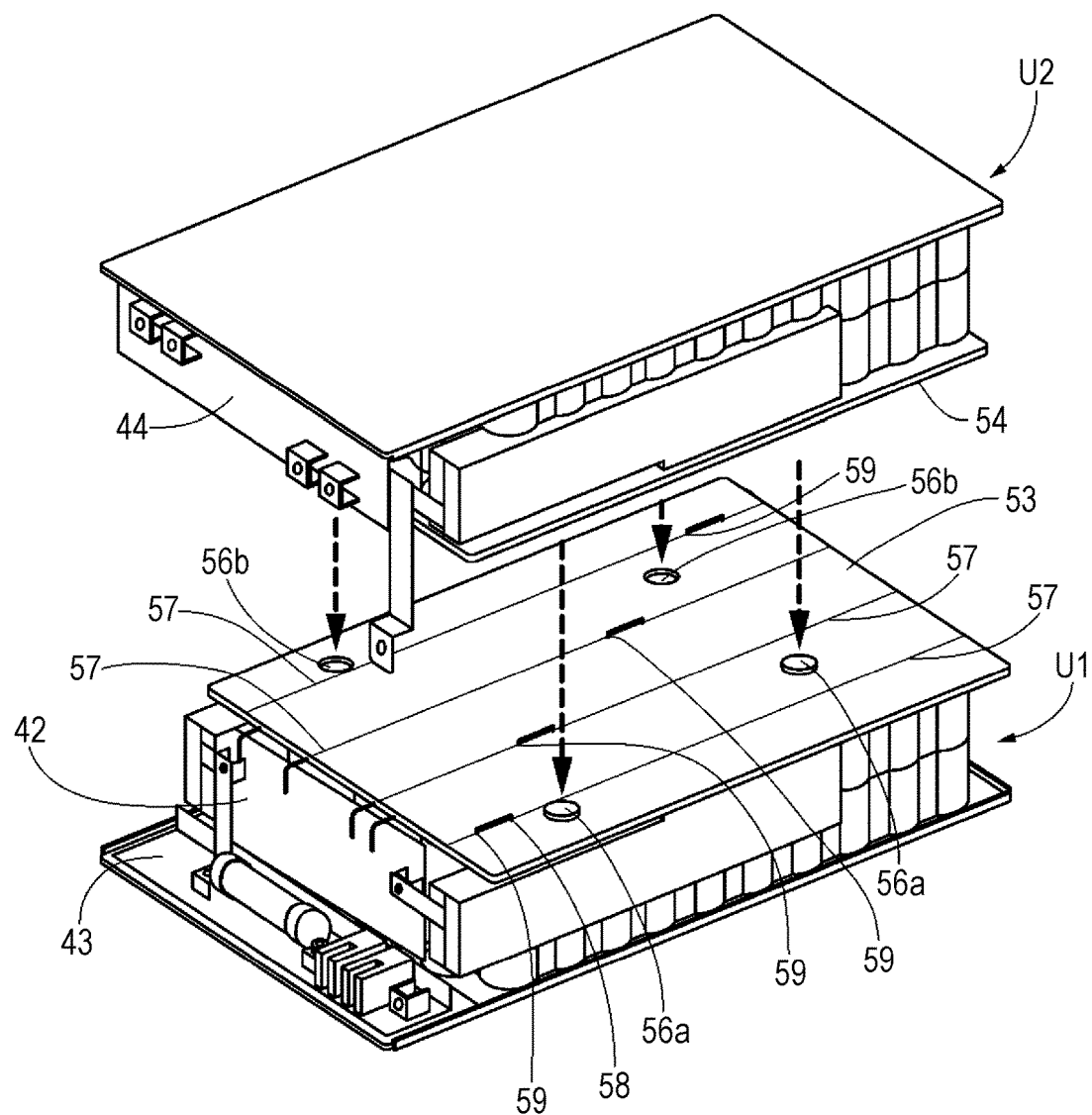
FIG. 12 is a perspective view for explaining the structures of resin plates.

As shown in FIG. 12, protrusions 56a, recesses 56b, grooves 57, and holes 59 for leading out cords 58 of thermistors are formed in the resin plate 53, for example. Although not shown in the drawing, protrusions 56a, recesses 56b, grooves 57, and holes 59 for leading out cords 58 of thermistors are also formed in the resin plate 54 facing the resin plate 53.

The two protrusions 56a and the two recesses 56b are provided for positioning at the time when the assembled units U1 and U2 are put together via the resin plate 53 and the resin plate 54. With the resin plates 53 and 54 being put together, the protrusions 56a of the resin plate 53 are engaged with the recesses 56b of the resin plate 54, and the recesses 56b of the resin plate 53 are engaged with the protrusions 56a of the resin plate 54. The cords 58 of the thermistors can be accommodated by any of the grooves 57 formed in the resin plate 53 and the resin plate 54, and resin plate 53 and the resin plate 54 excel in accommodating cords.

(Structures of the Boards)

Figure 13A:
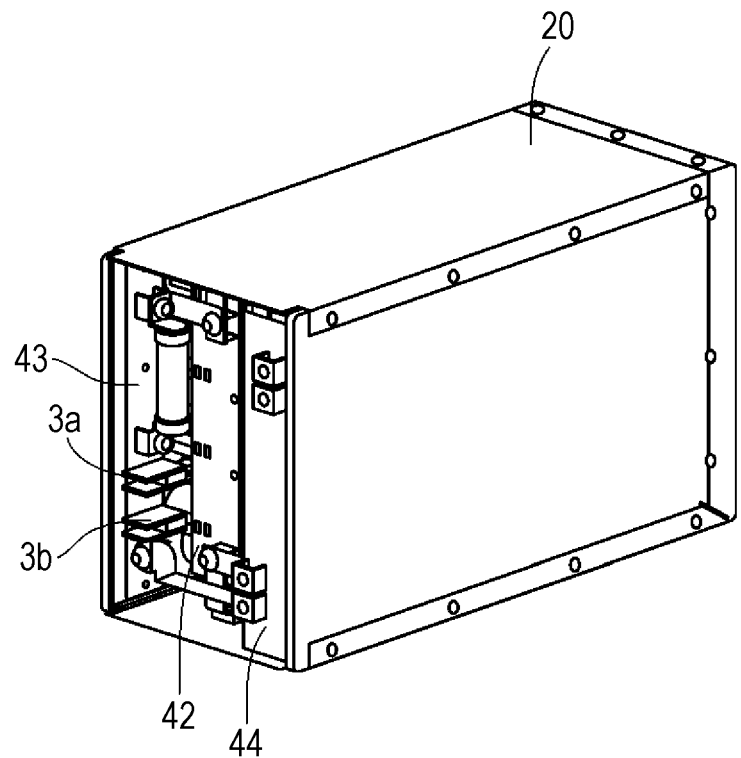
FIG. 13A is a perspective view of an example structure of an outer casing, with its front panel removed.
Figure 13B:
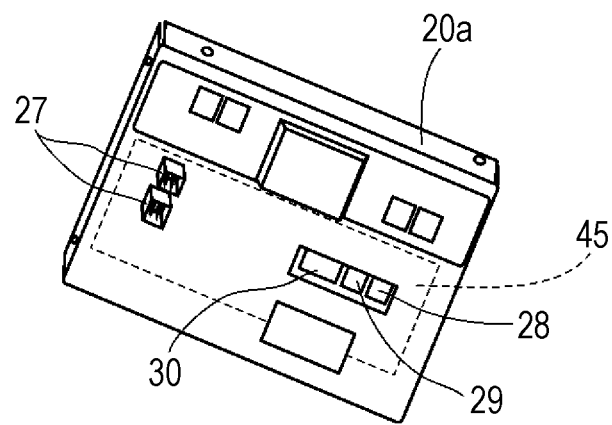
FIG. 13B is a perspective view of an example structure of the front panel removed from the outer casing.

FIG. 13A is a perspective view of the outer casing 20, with the front panel removed. FIG. 13B is a perspective view of the front panel removed from the outer casing 20. A space for accommodating a board is kept on the inner side of the front panel 20a, and a monitor board 45 is provided in this space, as shown in FIG. 13B.

The control block including the monitor and control circuits shown in FIGS. 3 and 4 is mounted on the monitor board 45 and the above described sub board 42. Typically, the communication unit COM1 is mounted on the monitor board 45, and the module controller CTN1, the MUX 16, the current detecting unit 9, the flyback transformer T1, and the insulating unit ISC1 are mounted on the sub board 42. According to the present technology, the circuit including the fuse 2 in which large current flows and the connectors 3a and 3b, and the circuit including output terminals are mounted on circuit boards (the fuse board 43 and the output terminal board 44) independent of the monitor board 45 and the sub board 46 on which the control block including the monitor and control circuits is mounted. With this structure, data communication of the monitor and control circuits is not damaged or affected by noise caused by current or power, and is not affected by heat generation of large current or the like. Accordingly, reliability can be increased. Furthermore, as the group of independent circuit boards (the sub board 42, the fuse board 43, the output terminal board 44, and the monitor board 45) are placed in the space between the inside surface of the front panel 20a and a wall surface of the battery casing 61, and are connected to one another by a plate-like connecting member, the circuit boards can be readily connected to one another.

(Battery Units)

Figure 14:
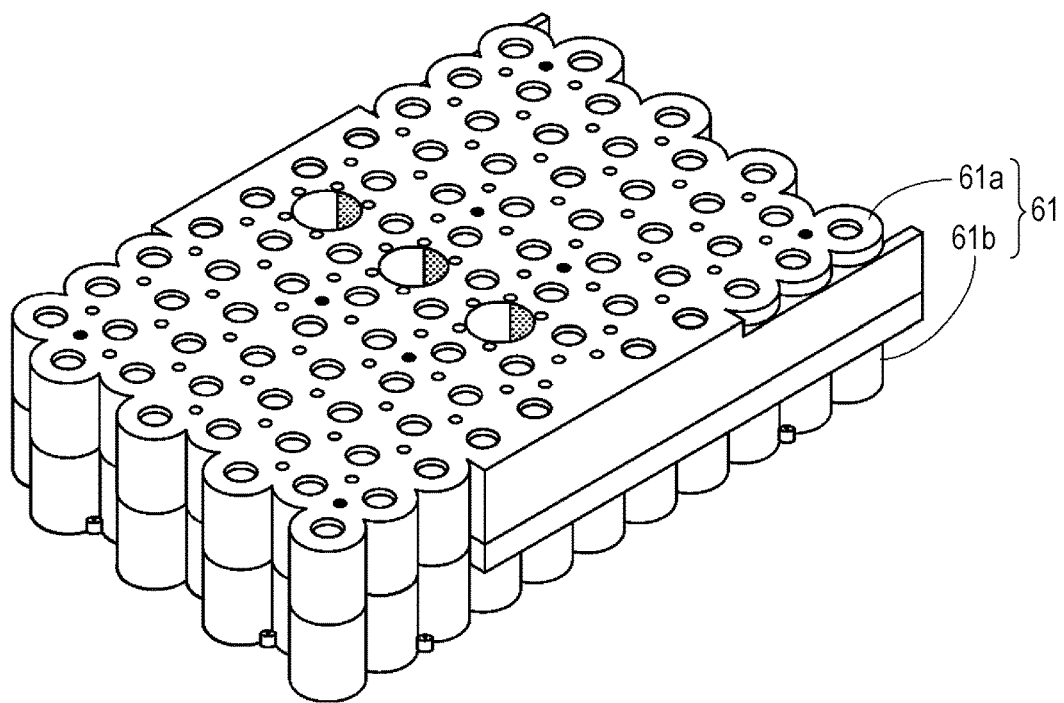
FIG. 14 is a perspective view of an example structure of a battery unit.

FIG. 14 is a perspective view of the exterior of a battery unit. The battery unit 51 is formed with the battery casing 61 housing the battery block group 10, partition plates 93a, partition plates 93b, tabs 91a and 91b, and positive insulating sheets 92, which will be described later. The battery unit 52 has the same structure as the battery unit 51. Therefore, in the description below, the structure of the battery unit 51 will be explained, but the structure of the battery unit 52 will not be specifically explained.

(Battery Casing)

Figure 15A:
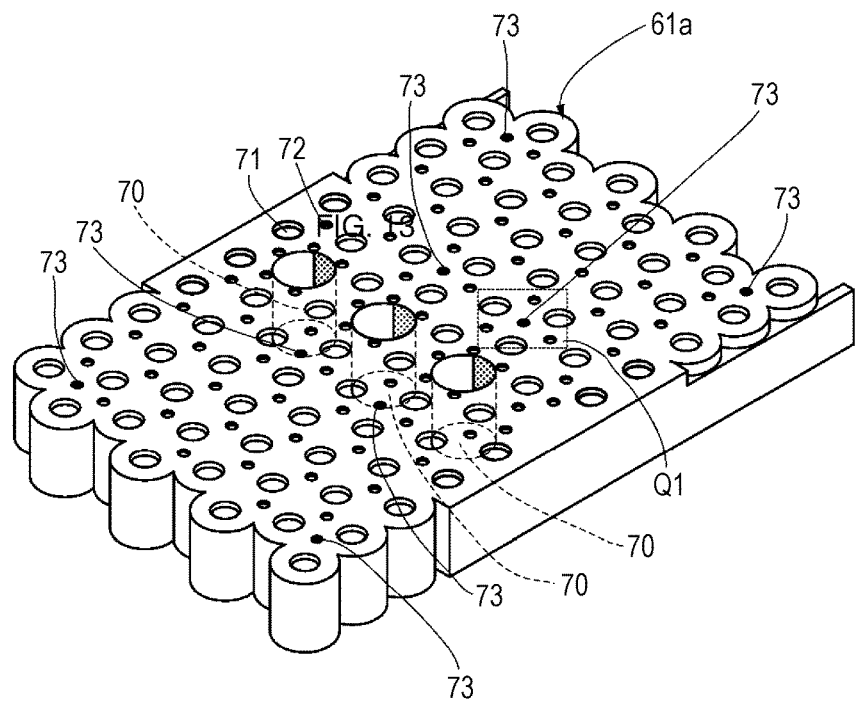
FIG. 15A is a perspective view of an example structure of a top casing.
Figure 15B:
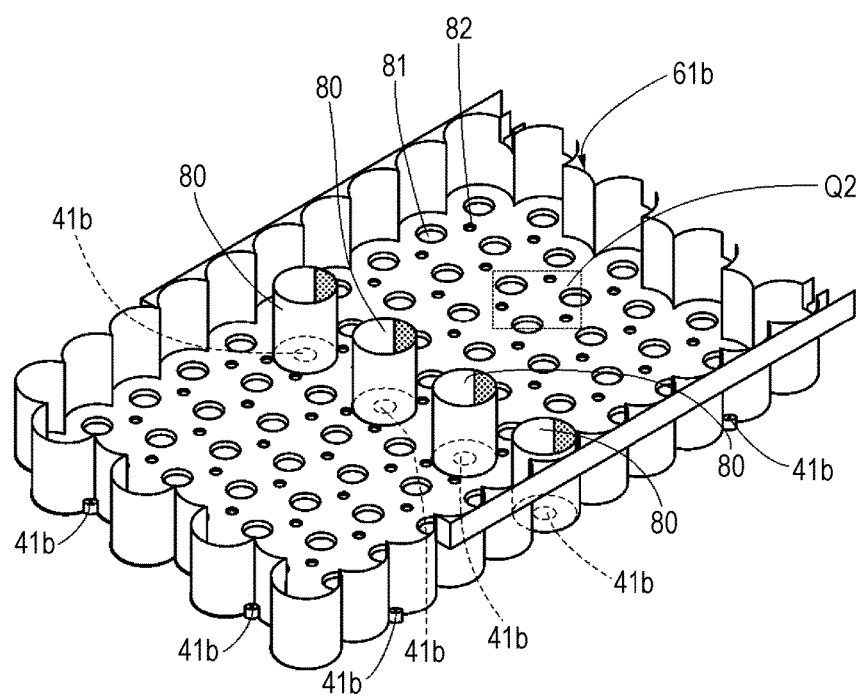
FIG. 15B is a perspective view of an example structure of a bottom casing.

The battery casing 61 is formed with the top casing 61a and the bottom casing 61b. FIG. 15A is a perspective view of an example structure of the top casing. FIG. 15B is a perspective view of an example structure of the bottom casing. The battery casing 61 is a resin molded item made of a resin having electrical insulation properties, for example.

(Top Casing)

As shown in FIG. 15A, the top casing 61a includes an upper surface portion and a wall portion standing around the upper surface portion. At the center of the upper surface portion, three hollow structural portions 70 are provided in a line. The hollow structural portions 70 are hollow structures that are hollow cylindrical portions each having an open upper surface and an open lower surface.

Figure 16A:
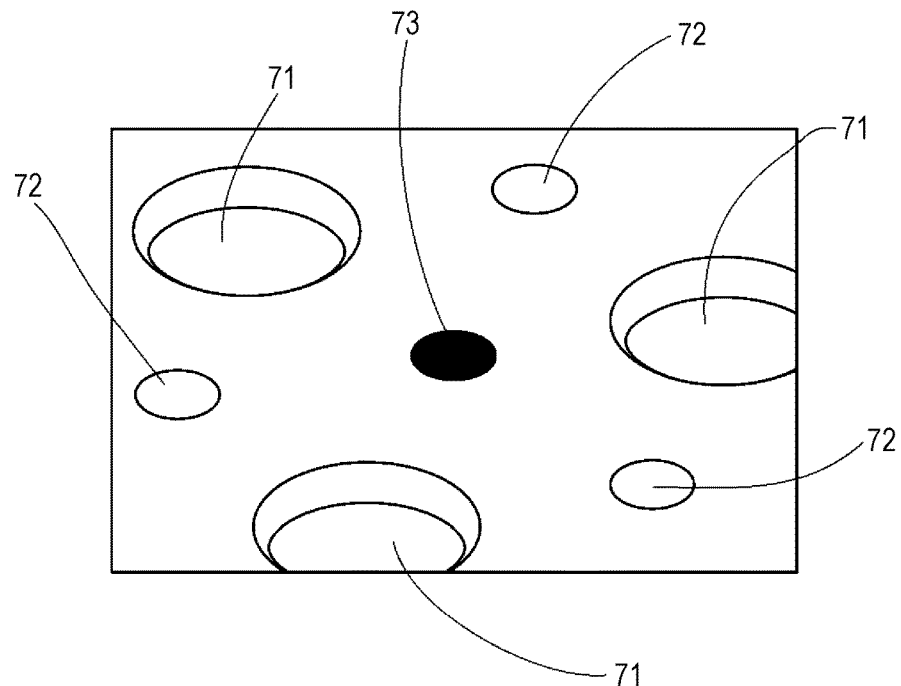
FIG. 16A is an enlarged view of a region Q1 shown in FIG. 15A.

FIG. 16A is an enlarged view of a region Q1 shown in FIG. 15A. As shown in FIG. 16A, the upper surface portion has openings 71 through which the tabs 91a or the tabs 91b described later are exposed. Holes 72 with which protrusions 94 of a partition plate 93 described later are to be engaged are formed in the upper surface portion. Holes 73 for thermistor insertion are also formed in the upper surface portion. For example, as shown in FIG. 15A, one hole 73 for thermistor insertion is provided at each of the four corners of the upper surface portion, and four holes 73 are formed near the center of the upper surface portion.

(Bottom Casing)

As shown in FIG. 15B, the bottom casing 61b includes a bottom surface portion and a wall portion standing around the bottom surface portion. At the center of the bottom surface portion, four hollow structural portions 80 are provided in a line. The hollow structural portions 70 have hollow structures that are hollow cylindrical portions each having an open upper surface and a hole 41b at the center of its lower surface. As described above, the holes 41b are engaged with the protrusions 31b formed on the side panel 20f, and clamping is performed with screws as necessary, so that the battery unit 51 is secured to the side panel 20f.

Figure 16B:
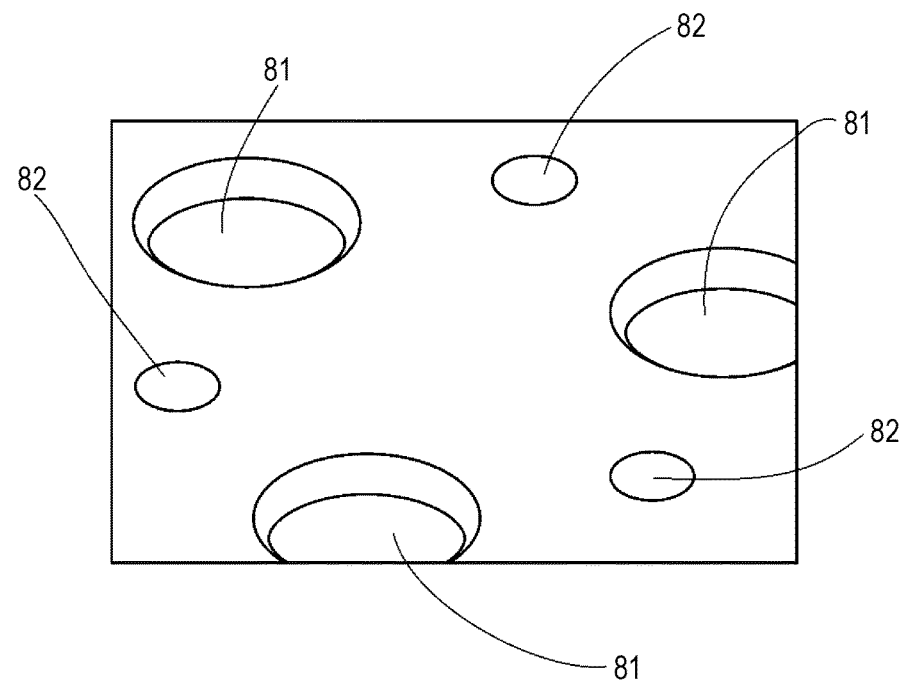
FIG. 16B is an enlarged view of a region Q2 shown in FIG. 15B.

FIG. 16B is an enlarged view of a region Q2 shown in FIG. 15B. As shown in FIG. 16B, the bottom surface portion has openings 81 through which the tabs 91b described later are exposed. Holes 82 with which the protrusions 94 of a partition plate 93 described later are to be engaged are also formed in the bottom surface portion.

(Internal Structure of a Battery Unit)
(Battery Block Group)

Figure 17:
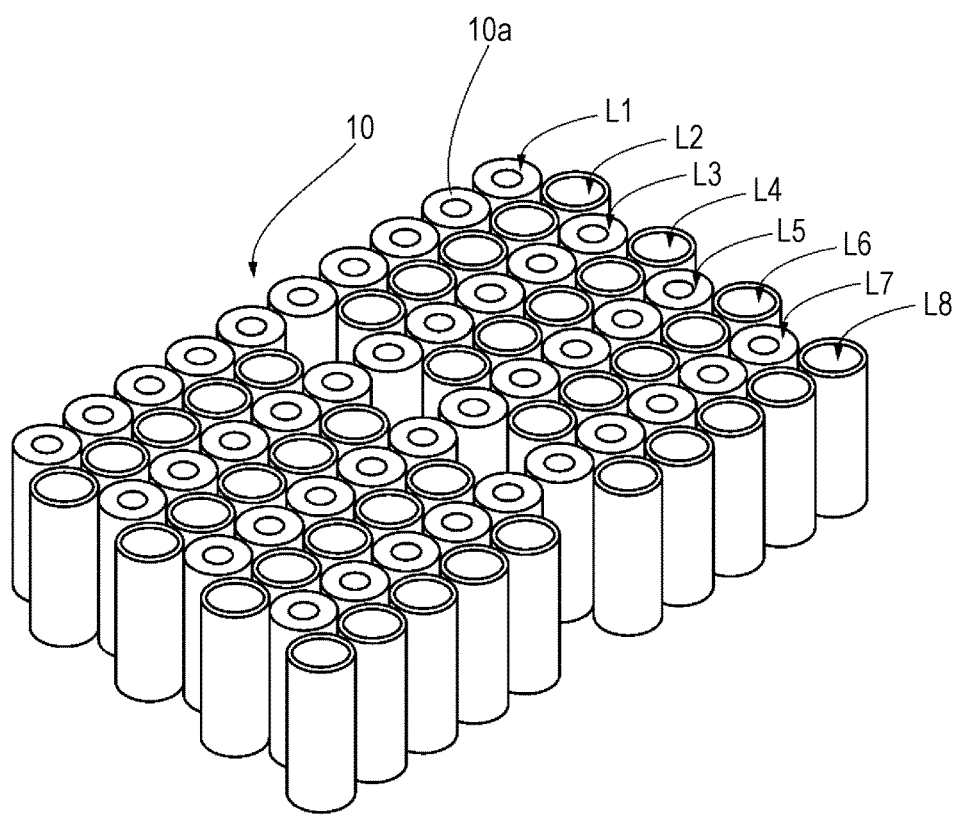
FIG. 17 is a perspective view of the battery unit shown in FIG. 14, minus the components other than the battery block group.

FIG. 17 is a perspective view of the battery unit shown in FIG. 14, minus the components other than the battery block group. As shown in FIG. 17, the battery block group 10 housed in the battery casing 61 is formed with battery cells 10a. The battery block group 10 has a structure in which battery lines L1 through L8 each including linearly-arranged battery cells 10a are arranged in parallel in a direction substantially perpendicular to the extending direction of the battery lines, for example. Each of the battery lines L1 through L8 is formed with 10 batteries, for example.

The battery cells 10a forming the battery block group 10 are electrically connected by the tabs 91a and 91b described later. For example, the respective battery lines L1 through L8 form the battery blocks B1 through B8 in which battery cells 10a are connected in parallel. Further, the battery blocks B1 through B8 are connected in series, to form the battery block group 10.

Although not shown in the drawings, the battery block group 10 housed in the battery casing 61 of the battery unit 52 has the same structure as above. For example, the respective battery lines L1 through L8 form the battery blocks B9 through B16 in which battery cells 10a are connected in parallel. Further, the battery blocks B9 through B16 are connected in series, to form the battery block group 10.

In the battery block group 10, the battery lines (the battery lines L1 through L8) in which battery cells 10a are connected in parallel are arranged in parallel in a direction substantially perpendicular to the extending direction of the lines, and are connected in series. Accordingly, the current pass can be rectified in one direction (a direction substantially perpendicular to the extending direction of the battery lines, for example), and the total length of the current path can be shortened. As a result, increases in resistance value can be restrained.

(Tabs on the Top Casing Side)

Figure 18A:
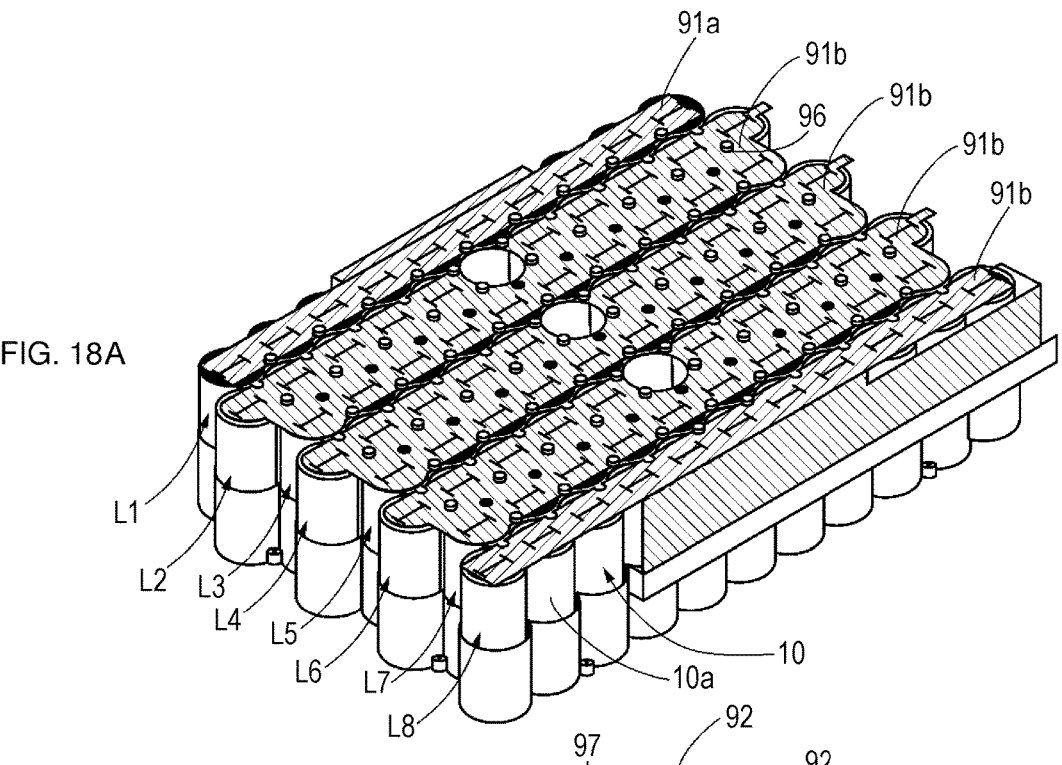
FIG. 18A is a perspective view of the battery unit shown in FIG. 14, minus its top casing.

FIG. 18A is a perspective view of the battery unit shown in FIG. 14, minus its top casing. As shown in FIG. 18A, the tabs 91a and the tabs 91b that are joining members electrically connecting battery cells 10a are provided on the terminal surfaces of the battery cells 10a. For example, two tabs 91a and three tabs 91b are arranged in parallel in a direction substantially perpendicular to the extending direction of the battery lines. The tabs 91b each have holes 96 through which protrusions 94 of a partition plate 93 are inserted.

A tab 91a is electrically joined to the terminal surfaces of the battery cells 10a constituting one battery line. A tab 91b is electrically joined to the terminal surfaces of the battery cells 10a constituting two adjacent battery lines.

Specifically, a tab 91a is electrically joined to the positive terminals of the battery cells 10a constituting the battery line L1. Another tab 91a is electrically joined to the positive terminals of the battery cells 10a constituting the battery line L8.

A tab 91b is electrically joined to the negative terminals of the battery cells 10a constituting the battery line L2 and the positive terminals of the battery cells 10a constituting the battery line L3. Another tab 91b is electrically joined to the negative terminals of the battery cells 10a constituting the battery line L4 and the positive terminals of the battery cells 10a constituting the battery line L5. Yet another tab 91b is electrically joined to the negative terminals of the battery cells 10a constituting the battery line L6 and the positive terminals of the battery cells 10a constituting the battery line L7.

The joining method may be electric resistance welding or laser heat welding, for example. However, the joining method is not particularly limited to these methods, and any conventional welding method may be used as appropriate.

According to the present technology, at least one battery line is connected by one tab 91a or one tab 91b, so that the resistance value can be lowered, and terminal heat generation can be reduced. The tabs can also be joined to one another by a simple joining method. The battery cells 10a can share a measuring terminal. The battery cells 10a constituting a battery line are joined together by one tab. Accordingly, the assembling work can be simplified, and the work efficiency in the assembling can be increased. Furthermore, the number of joined portions can be reduced, and accordingly, the temperature increase in the battery cells 10a at the time of assembling and joining can be reduced. The heat generated by the battery cells 10a during charging and discharging can be transferred to the tabs 91a and the tabs 91b, and be released.

(Positive Insulating Sheets on the Top Casing Side)

Figure 18B:
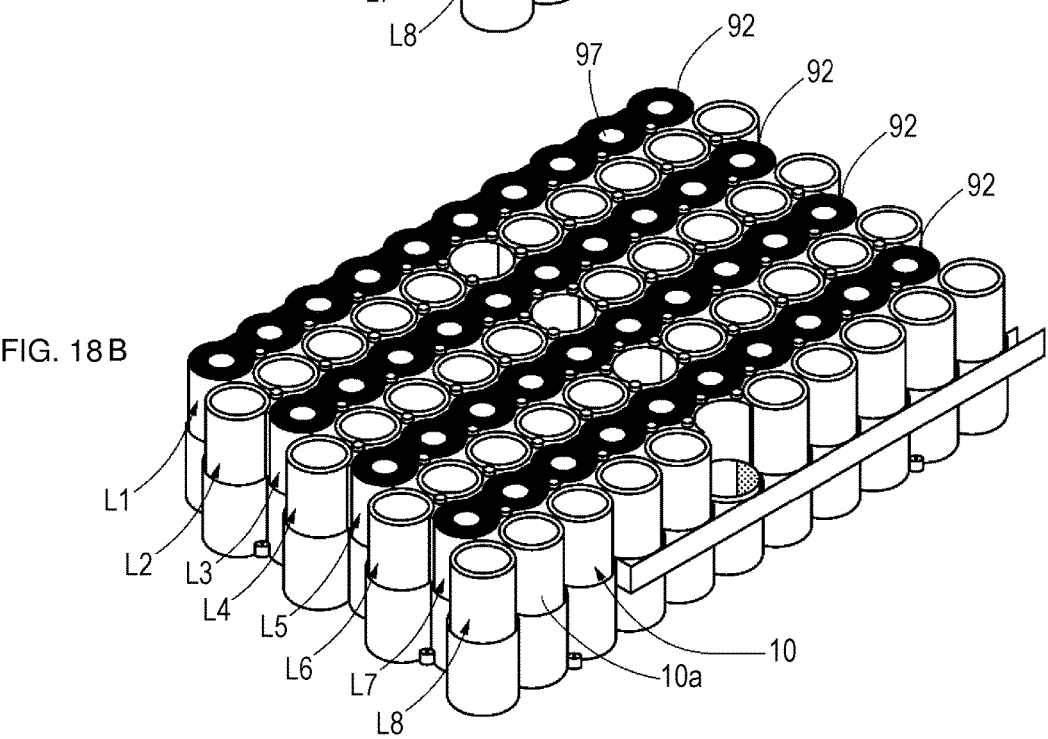
FIG. 18B is a perspective view of the structure shown in FIG. 18A, with the tabs.

FIG. 18B is a perspective view of the structure shown in FIG. 18A, with the tabs. As shown in FIG. 18B, the positive insulating sheets 92 are placed on the positive terminal surfaces of battery cells 10a constituting the battery block group 10. Specifically, the positive insulating sheets 92 are placed on the positive terminal surfaces of the battery cells 10a whose upper surfaces are the positive terminal surfaces. In the example shown in FIG. 18B, the positive insulating sheets 92 are placed on the positive terminal surfaces of the respective battery cells 10a constituting the battery line L1, the battery line L3, the battery line L5, and the battery line L7.

The positive insulating sheets 92 are made of a material having electrical insulation properties, such as a resin material having electrical insulation properties. The positive insulating sheets 92 each have openings 97 into which the protruding positive terminals are to be inserted.

The positive terminals are inserted into the respective openings 97 of the positive insulating sheets 92, and the respective positive terminals are exposed through the openings 97 of the positive insulating sheets 92. The positive terminals and the tabs 91a or the tabs 91b exposed through the openings 97 of the positive insulating sheets 92 are electrically joined. Meanwhile, the surfaces around the positive terminals are covered with the positive insulating sheets 92, so that the surfaces around the respective positive terminals are insulated from the tabs 91a or the tabs 91b.

(Structures of a Battery Block Group and Partition Plates)

Figure 19:
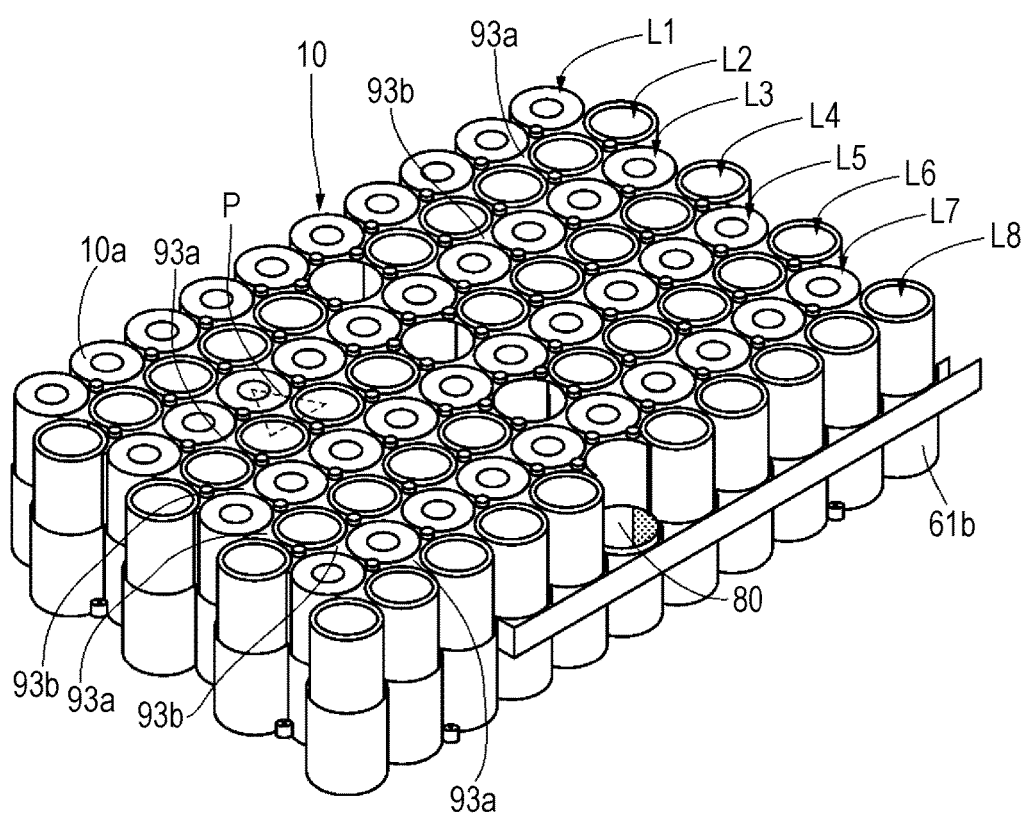
FIG. 19 is a perspective view of the structure shown in FIG. 18B, minis the tabs and the insulating sheets.

FIG. 19 is a perspective view of the structure shown in FIG. 18B, minus the tabs and the insulating sheets. The battery lines L1 through L8 are arranged in parallel in a direction substantially perpendicular to the extending direction of the battery lines, to form the battery block group 10.

In the battery block group 10, the battery line L1 and the battery line L2 are positioned to face each other, the battery line L2 and the battery line L3 are positioned to face each other, the battery line L3 and the battery line L4 are positioned to face each other, the battery line L4 and the battery line L5 are positioned to face each other, the battery line L5 and the battery line L6 are positioned to face each other, and the battery line L7 and the battery line L8 are positioned to face each other. In the battery lines L1, L3, L5, and L7, the battery cells 10a constituting these battery lines each have a positive terminal surface as the upper surface and a negative terminal surface as the lower surface. In the battery lines L2, L4, L6, and L8, the battery cells 10a constituting these battery lines each have a negative terminal surface as the upper surface and a positive terminal surface as the lower surface.

In the odd-numbered battery lines L1, L3, L5, and L7, the battery cells 10a constituting each of the battery lines are linearly arranged in parallel in a close contact state. In the odd-numbered battery lines L1, L3, L5, and L7 in the example shown in FIG. 19, the 10 battery cells 10a constituting each of the battery lines are linearly arranged in parallel in a close contact state.

In the even-numbered battery lines L2, L4, L6, and L8, on the other hand, the battery cells 10a constituting each of the battery lines are positioned so that a space of the size of one battery cell 10a is formed between two sets of battery cells 10a that are linearly arranged in parallel in a close contact state. The space of the size of one battery is preferably formed in a position facing the center of the adjacent and facing battery line L1, L3, L5, or L7, for example.

In the even-numbered battery lines L2, L4, L6, and L8 in the example shown in FIG. 19, the 10 battery cells 10a constituting each of the battery lines are positioned so that a space of the size of one battery cell 10a is formed between two sets of five battery cells 10a that are linearly arranged in parallel in a close contact state. The space of the size of one battery is formed in a position facing the center of the adjacent and facing battery line L1, L3, L5, or L7, for example.

In each space of the size of one battery cell 10a, a hollow structural portion 80 of the bottom casing 61b and a hollow structural portion 70 (not shown in FIG. 19) of the top casing 61a facing the hollow structural portion 80 are inserted. As described above, the holes 41b are formed in the bottom surfaces of the hollow structural portions 80 of the bottom casing 61b, the protrusions 31b of the side panel 20f are engaged with the holes 41b, and clamping is performed with screws as necessary, so that the battery unit 51 is secured to the side panel 20f. As portions secured to the side panel 20f are formed near the center of the battery unit 51, the portions near the center of the battery unit 51 are prevented from swelling due to shifting of the battery cells 10a constituting the battery block group 10.

In the battery block group 10 formed with the battery lines L1 through L8, each two adjacent battery lines are deviated from each other in the extending direction by the length substantially equal to the outer radius of each battery cell 10a, so that the battery cells 10a are arranged like stacked straw bags. As indicated by a dotted line P, in the arrangement like a straw bag stack, the centers of end surfaces of two adjacent battery cells 10a of one line and the center of the battery cell 10a that is located between the two adjacent battery cells 10a of the one line and belong to another line adjacent to the one line may form an equilateral triangle.

In the arrangement like a straw bag stack, a larger number of battery cells 10a can be housed in the battery casing 61 with a limited space. Accordingly, the number of battery cells per unit area can be increased, and the energy density of the power storage device 1 can be increased.

(Partition Plates)

The partition plates 93a and the partition plates 93b (also referred to as the partition plates 93 when the two types are not discriminated from each other) are inserted between the adjacent battery lines of the battery block group 10. Each partition plate 93 is a resin molded item made of a resin having electrical insulation properties, for example.

The partition plates 93 can be attached to and detached from the battery casing 61. Each partition plate 93a has protrusions 93a on the upper surface and the lower surface, and the protrusions 93a are engaged with the holes 72 and the holes 82 of the battery casing 61, so that the partition plate 93a is attached to the battery casing 61. The protrusions 93a are disengaged from the protrusions 93a, so that the partition plate 93a is detached from the battery casing 61.

Figure 20A:
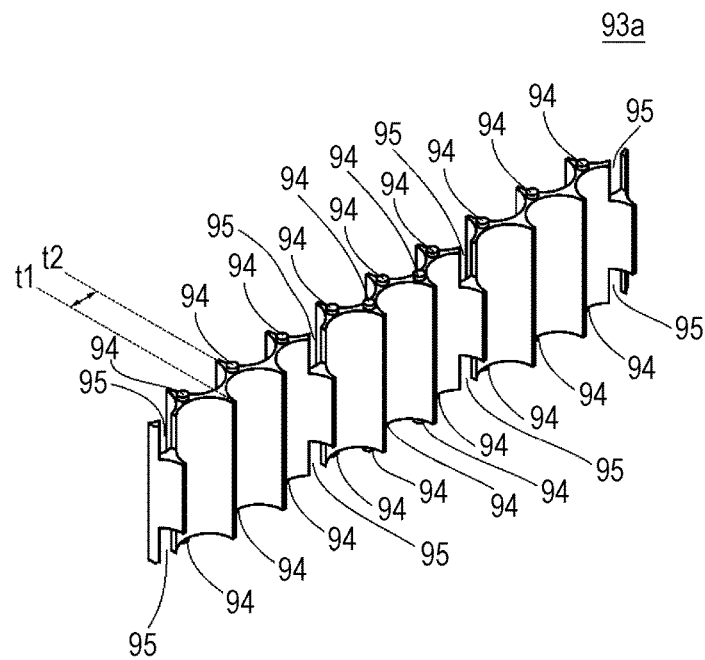
FIG. 20A is a perspective view of an example structure of a partition plate.
Figure 20B:
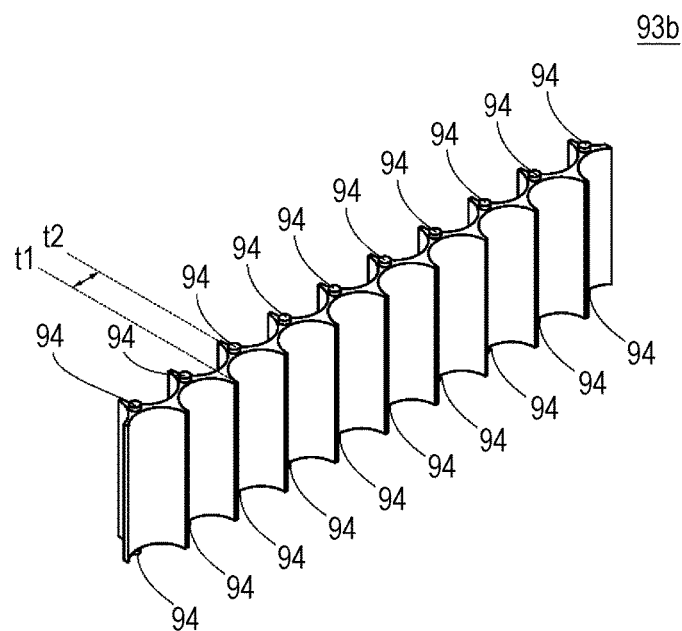
FIG. 20B is a perspective view of an example structure of a partition plate.

In the example shown in FIG. 19, the partition plate 93a shown in FIG. 20A or the partition plate 93b shown in FIG. 20B is inserted between each two battery lines facing each other. For example, a partition plate 93a is inserted between the battery line L1 and the battery line L2, which are adjacent to and face each other. A partition plate 93b is inserted between the battery line L2 and the battery line L3, which are adjacent to and face each other. A partition plate 93a is inserted between the battery line L3 and the battery line L4, which are adjacent to and face each other. A partition plate 93b is inserted between the battery line L4 and the battery line L5, which are adjacent to and face each other. A partition plate 93a is inserted between the battery line L5 and the battery line L6, which are adjacent to and face each other. A partition plate 93b is inserted between the battery line L6 and the battery line L7, which are adjacent to and face each other. A partition plate 93a is inserted between the battery line L7 and the battery line L8, which are adjacent to and face each other.

As shown in FIG. 20A, each partition plate 93a has an upper surface, a lower surface, and two side surfaces connecting the upper surface and the lower surface.

Each partition plate 93a has such a shape as to be inserted between battery lines that are adjacent to and face each other. Specifically, each partition plate 93a has such a shape as to be inserted between battery lines that are adjacent to and face each other among battery lines that are arranged like stacked straw bags, for example.

More specifically, each of the two side surfaces of each partition plate 93b includes a continuously-curved shape having curved walls that are bent like semicircular arcs and are connected, for example. In the continuously-curved shapes of the two side surfaces, curved-wall connecting positions t1 and t2 are deviated from each other by a length equivalent to the radius of each semicircular arc. The battery cells 10a are positioned and secured so that the side surface of one battery cell 10a faces one curved wall.

(Cut-Away Portions)

Each partition plate 93a has cut-away portions 95 for securing the spaces for accommodating or positioning thermistors.

Figure 21:
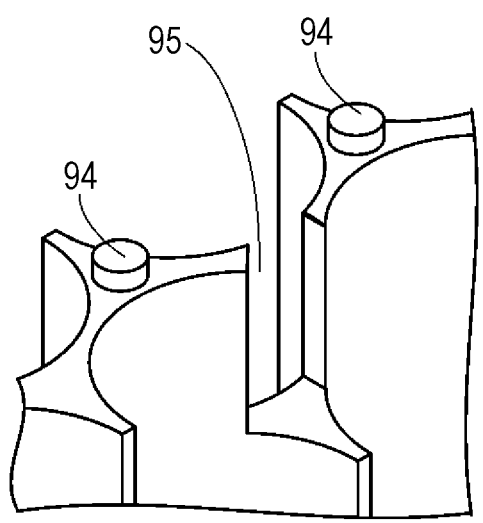
FIG. 21 is an enlarged perspective view of a cut-away portion of a partition plate.

FIG. 21 is an enlarged perspective view of a cut-away portion 95 of a partition plate 93a. As shown in FIGS. 20A and 21, cut-away portions 95 are formed by cutting away some portions from the upper edge and the lower edge in the positions where the curved walls are connected. For example, in a partition plate 93a, cut-away portions 95 are formed at the upper edge and the lower edge in positions (four positions) where adjacent curved walls are connected. When the partition plates 93a are combined with the battery casing 61, the cut-away portions 95 are located vertically below the holes 73 for terminal insertion in the top casing 61a, and secure the spaces accommodating thermistors inserted through the holes 73. The cut-away portions 95 of each partition plate 93a may be formed only at the upper edge.

(Protrusions)

Protrusions 94 are formed in predetermined positions on the upper surface and the lower surface of each partition plate 93a. The protrusions 94 formed on the upper surface are engaged with the holes 72 that are formed in predetermined positions on the top casing 61a and are to position the partition plate, and the protrusions 94 formed on the lower surface are engaged with the holes 82 that are formed in predetermined positions on the bottom casing 61b and are to position the partition plate. With this, the partition plate 93a is secured between the top casing 61a and the bottom casing 61b.

As shown in FIG. 20B, each partition plate 93b has an upper surface, a lower surface, and two side surfaces connecting the upper surface and the lower surface, like each partition plate 93a. However, unlike each partition plate 93a, each partition plate 93b does not have any cut-away portion 95.

Like each partition plate 93a, each partition plate 93b has such a shape as to be inserted between two battery lines that face each other. Specifically, each partition plate 93b has such a shape as to be inserted between two battery lines that face each other among battery lines that are arranged like stacked straw bags, for example.

More specifically, each of the two side surfaces of each partition plate 93b includes a continuously-curved shape having curved walls that are bent like semicircular arcs and are connected, for example. In the continuously-curved shapes of the two side surfaces, curved-wall connecting positions t1 and t2 are deviated from each other by a length equivalent to the radius of each semicircular arc.

(Protrusions)

Like each partition plate 93a, each partition plate 93b has protrusions 94 in predetermined positions on the upper surface and the lower surface. The protrusions 94 on the upper surface are engaged with the holes 72 that are formed in predetermined positions on the bottom surface portion of the top casing 61a and are to position the partition plate, and the protrusions 94 on the lower surface are engaged with the holes 82 that are formed in predetermined positions on the bottom surface portion of the bottom casing 61b and are to position the partition plate. With this, the partition plate 93b is secured between the top casing 61a and the bottom casing 61b.

As the partition plates 93a and 93b are secured, the battery cells 10a can be positioned and secured in predetermined positions. Accordingly, the battery block group 10 having the battery cells 10a secured in optimum positions with a high energy density can be formed, without a holder casing or the like in which separate battery holders corresponding to the shapes of the respective batteries are provided as in a conventional structure.

Also, as the secured partition plates 93a and 93b are provided between battery lines stacked with the side surfaces of the battery cells 10a facing in the vertical direction, the load applied from the upper battery cells 10a to the lower battery cells 10a can be reduced, for example. In this manner, pressure and stress are scattered, and can be distributed throughout the entire battery block group 10. Accordingly, deformation or the like of the battery cells 10a can be prevented.

(Positive Insulating Sheets on the Bottom Casing Side)

Figure 22A:
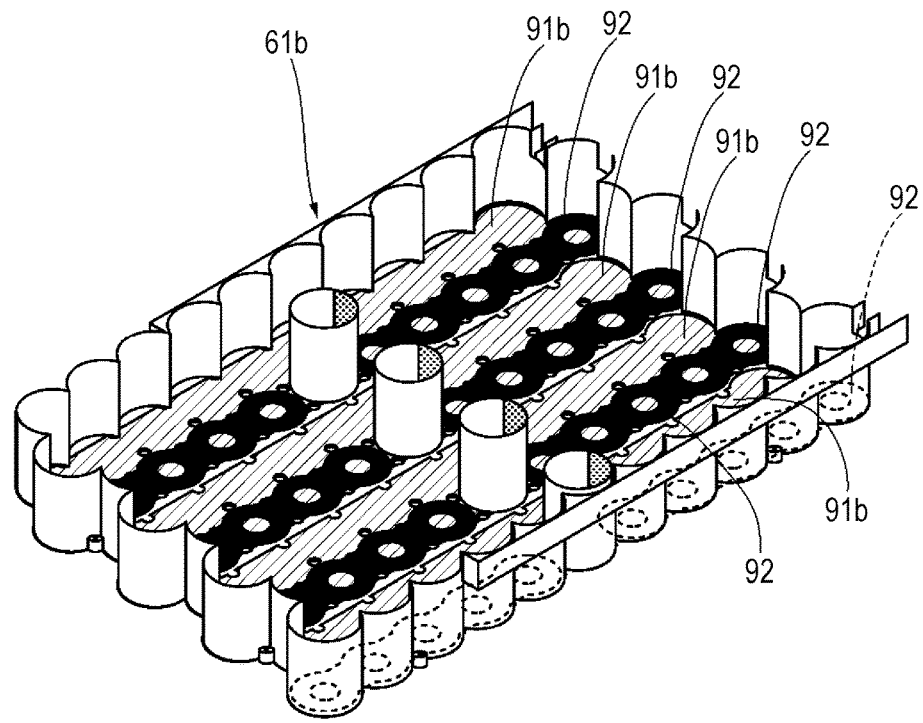
FIG. 22A shows a structure formed by removing the battery block group and the partition plates from the structure shown in FIG. 19.

FIG. 22A shows a structure formed by removing the battery block group and the partition plates from the structure shown in FIG. 19. Like the positive insulating sheets 92 on the top casing side, the positive insulating sheets 92 on the side of the bottom casing 61b are designed to restrain short-circuiting between the surfaces around the protruding positive terminals and the tabs 91b. The positive insulating sheets 92 on the bottom casing side are placed on the positive terminal surfaces of the battery cells 10a of the battery line L2, the battery line L4, the battery line L6, and the battery line L8.

(Tabs on the Bottom Casing Side)

Figure 22B:
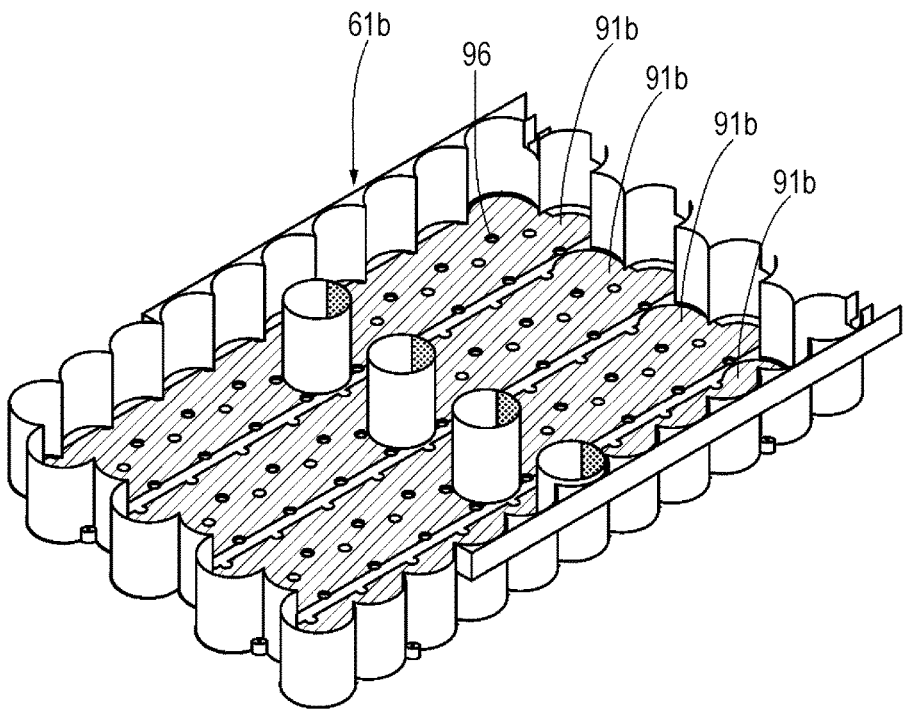
FIG. 22B shows a structure formed by removing the positive insulating sheets from the structure shown in FIG. 22A.

FIG. 22B shows a structure formed by removing the positive insulating sheets from the structure shown in FIG. 22A. As shown in FIG. 22B, on the inner side surface of the bottom surface portion of the bottom casing 61b, tabs 91b are arranged in parallel in a direction substantially perpendicular to the extending direction of the battery lines. One tab 91b is electrically joined to the terminals on the lower surfaces of the battery cells 10a constituting two adjacent battery lines. The tabs 91b each have holes 96 through which protrusions 94 of a partition plate 93 are inserted.

Specifically, a tab 91b is electrically joined to the negative terminals of the battery cells 10a constituting the battery line L1 and the positive terminals of the battery cells 10a constituting the battery line L2. Another tab 91b is electrically joined to the negative terminals of the battery cells 10a constituting the battery line L3 and the positive terminals of the battery cells 10a constituting the battery line L4. Yet another tab 91b is electrically joined to the negative terminals of the battery cells 10a constituting the battery line L5 and the positive terminals of the battery cells 10a constituting the battery line L6. Still another tab 91b is electrically joined to the negative terminals of the battery cells 10a constituting the battery line L7 and the positive terminals of the battery cells 10a constituting the battery line L8.

(Comparison with Conventional Technologies)

As conventional technologies relevant to the above described power storage device according to the first embodiment of the present technology, Patent Document 1 (Japanese Patent Application Laid-Open No. 2011-154811), Patent Document 2 (Japanese Patent Application Laid-Open No. 2011-154882), and Patent Document 3 (Japanese Patent Application Laid-Open No. 2011-154883) disclose battery systems in which battery lines each formed by linearly arranging battery cells are arranged in parallel in a direction substantially perpendicular to the extending direction of the battery lines, and are housed in a battery holder. In such a battery system, a connecting terminal strip is joined to the terminal surfaces of two adjacent battery lines housed in a battery holder, the battery cells forming a battery line are connected in parallel, battery lines are connected in series, and those battery lines are housed in an outer housing, as disclosed in the above documents.

In this battery system, however, a battery holder designed mainly for securing battery cells is used. Therefore, the space for the battery holder is large, and an optimum structure for achieving a high energy density is not obtained.

As described above, in the conventional technologies, optimum positioning of battery cells and optimum securing of the battery cells for achieving a high energy density as with the present technology are not performed at the same time.

Patent Document 4 (Japanese Patent Application Laid-Open No. 2011-175896) discloses an assembled battery configuration using partition plates having ribs that are formed with hollow structures in parallel with battery cell lines. Patent Document 4 discloses a configuration in which zig-zag terminals connecting cells are used as connecting terminals so as to efficiently release heat from the cell surfaces.

However, those conventional technologies do not take into consideration the conductivity of connecting terminals, heat generation caused at a time of application of a high current, and the demarcation current. Further, other aspects such as the strength and torsion of the terminal joining units subjected to vibration or shock are not taken into consideration, and the terminal junction strength is low.

2. Second Embodiment

An example structure of a power storage device according to a second embodiment of the present technology is now described. Two battery units 51 and 52 that are the same as those of the first embodiment are housed in an outer casing 20 that is a housing substantially in the form of a rectangular parallelepiped. In the outer casing 20, the bottom surface portion of the top casing and the bottom surface portion of the bottom casing face in the vertical direction, and the two battery units 51 and 52 are stacked in two stages in the horizontal direction. Other than the above, the second embodiment is substantially the same as the first embodiment. In the description below, detailed explanation of the same aspects as those of the first embodiment will not be repeated.

Figure 23A:
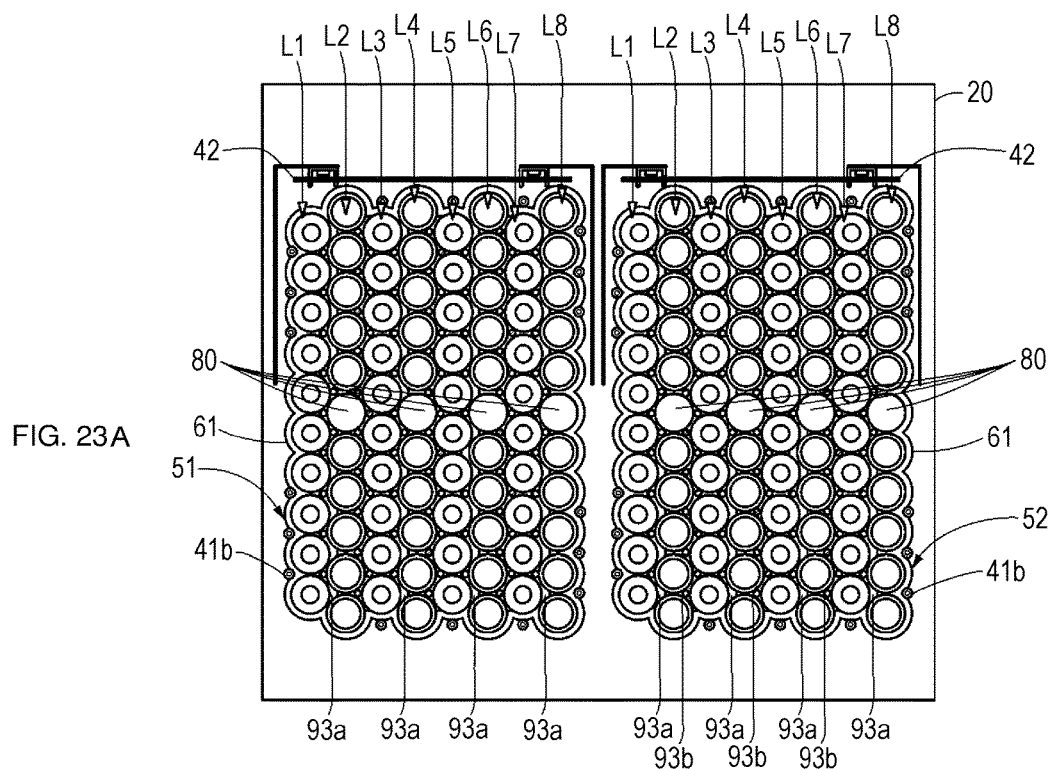
FIG. 23A is a schematic plan view of a power storage device.
Figure 23B:
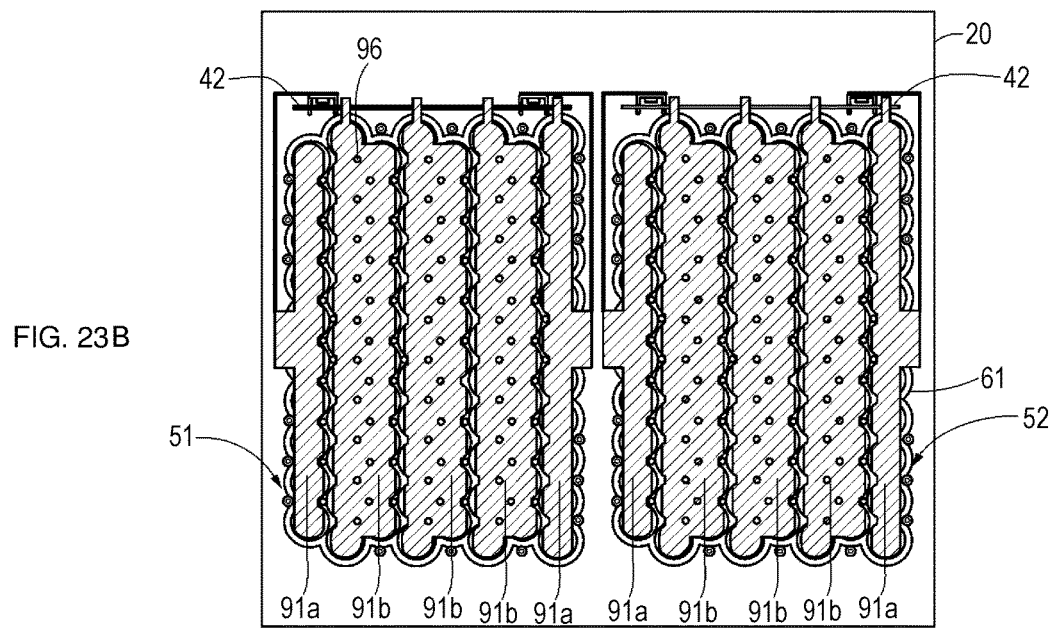
FIG. 23B is a schematic plan view of the power storage device.

FIG. 23A is a schematic top view of the power storage device minus the top panel, the top casing of the battery casing, the tabs, and the positive insulating sheets. FIG. 23B is a schematic top view of the power storage device minus the top panel and the top casing of the battery casing. In the power storage device according to the second embodiment, protrusions 31*a* for positioning circuit boards, and protrusions 31*b* for positioning the battery unit 51 and the battery unit 52 are provided on the top panel and the bottom panel of the outer casing 20.

The protrusions 31*b* formed on the top panel and the bottom panel are engaged with the holes 41*b* formed in the corresponding positions on the battery casing 61 and the holes 41*b* formed in the corresponding positions on the bottom surface portion of the bottom casing, for example, so that the battery casing 61 is secured in a predetermined position. Also, the protrusions 31*a* formed on the top panel and the bottom panel are engaged with the respective holes (not shown) formed in the corresponding positions in an output terminal board (not shown) and a fuse board (not shown), so that the output terminal board and the fuse board are secured in predetermined positions. The front panel and the bottom panel are the same as those of the first embodiment. The two side panels are the same as the top panel and the bottom panel of the first embodiment.

As in the first embodiment, a battery block group 10 in which battery cells 10*a* are arranged like a stacked straw bags is housed in the battery casing 61. In the battery block group 10, the battery line L1 and the battery line L2 are positioned to face each other, the battery line L2 and the battery line L3 are positioned to face each other, the battery line L3 and the battery line L4 are positioned to face each other, the battery line L4 and the battery line L5 are positioned to face each other, the battery line L5 and the battery line L6 are positioned to face each other, the battery line L6 and the battery line L7 are positioned to face each other, and the battery line L7 and the battery line L8 are positioned to face each other. In the battery lines L1, L3, L5, and L7, the battery cells 10*a* constituting these battery lines each have a positive terminal surface as the upper surface and a negative terminal surface as the lower surface. In the battery lines L2, L4, L6, and L8, the battery cells 10*a* constituting these battery lines each have a negative terminal surface as the upper surface and a positive terminal surface as the lower surface.

In the odd-numbered battery lines L1, L3, L5, and L7, the battery cells 10*a* constituting each of the battery lines are linearly arranged in parallel in a close contact state, as in the first embodiment. In the even-numbered battery lines L2, L4, L6, and L8, on the other hand, the battery cells 10*a* constituting each of the battery lines are positioned so that a space of the size of one battery cell 10*a* is formed between two sets of battery cells 10*a* that are linearly arranged in parallel in a close contact state. In each space of the size of one battery cell 10*a*, a hollow structural portion 80 of the bottom casing 61*b* and a hollow structural portion 70 (not shown in FIG. 23) of the top casing 61*a* facing the hollow structural portion 80 are inserted.

A partition plate 93*a* or a partition plate 93*b* that are the same as those of the first embodiment is inserted between each two battery lines facing each other. For example, a partition plate 93*a* is inserted between the battery line L1 and the battery line L2. A partition plate 93*b* is inserted between the battery line L2 and the battery line L3. A partition plate 93*a* is inserted between the battery line L3 and the battery line L4. A partition plate 93*b* is inserted between the battery line L4 and the battery line L5. A partition plate 93*a* is inserted between the battery line L5 and the battery line L6. A partition plate 93*b* is inserted between the battery line L6 and the battery line L7. A partition plate 93*a* is inserted between the battery line L7 and the battery line L8.

Protrusions 94 to be engaged with holes 72 and 82 in the top casing 61*a* and the bottom casing 61*b* are formed in the upper surfaces and the lower surfaces of the partition plates 93*a*. Likewise, protrusions 94 to be engaged with the holes 72 and 82 in the top casing 61*a* and the bottom casing 61*b* are formed in the upper surfaces and the lower surfaces of the partition plates 93*b*.

As in the first embodiment, tabs 91*a* and tabs 91*b* connecting the battery cells 10*a* are provided. As shown in FIG. 23B, on the terminal surfaces of the battery cells 10*a*, two tabs 91*a* and three tabs 91*b* are arranged in parallel on the terminal surfaces of the battery cells 10*a*. A tab 91*a* is electrically joined to the terminal surfaces of the battery cells 10*a* constituting one battery line. A tab 91*b* is electrically joined to the terminal surfaces of the battery cells 10*a* constituting two adjacent battery lines. Although not shown in the drawing, on the upper surface and the lower surface of the battery block group 10, positive insulating sheets 52 are provided on the positive terminal surfaces, and the positive insulating sheets 52 are provided to insulate the surfaces surrounding the protruding positive terminals from the tabs, as in the first embodiment.

3. Modifications

The present technology is not limited to the above described embodiments of the present technology, and various changes and modifications may be made to them without departing from the scope of the present technology.

For example, the numerical values, structures, shapes, materials, raw materials, manufacturing processes, and the like, which have been described in the above embodiments, are merely examples, and different numerical values, structures, shapes, materials, raw materials, manufacturing processes, and the like from the above may be used where necessary. For example, "protrusions" and "holes" may be one protrusion and one hole.

Also, the structures, methods, procedures, shapes, materials, numerical values, and the like mentioned in the above embodiments can be combined as appropriate, without departing from the scope of the present technology.

For example, the power storage device according to the first embodiment and the power storage device according to the second embodiment may have the structures described below.

(Structure in Which Heat Releasing Rubbers are Provided in the Bottom Casing)

Figure 24:
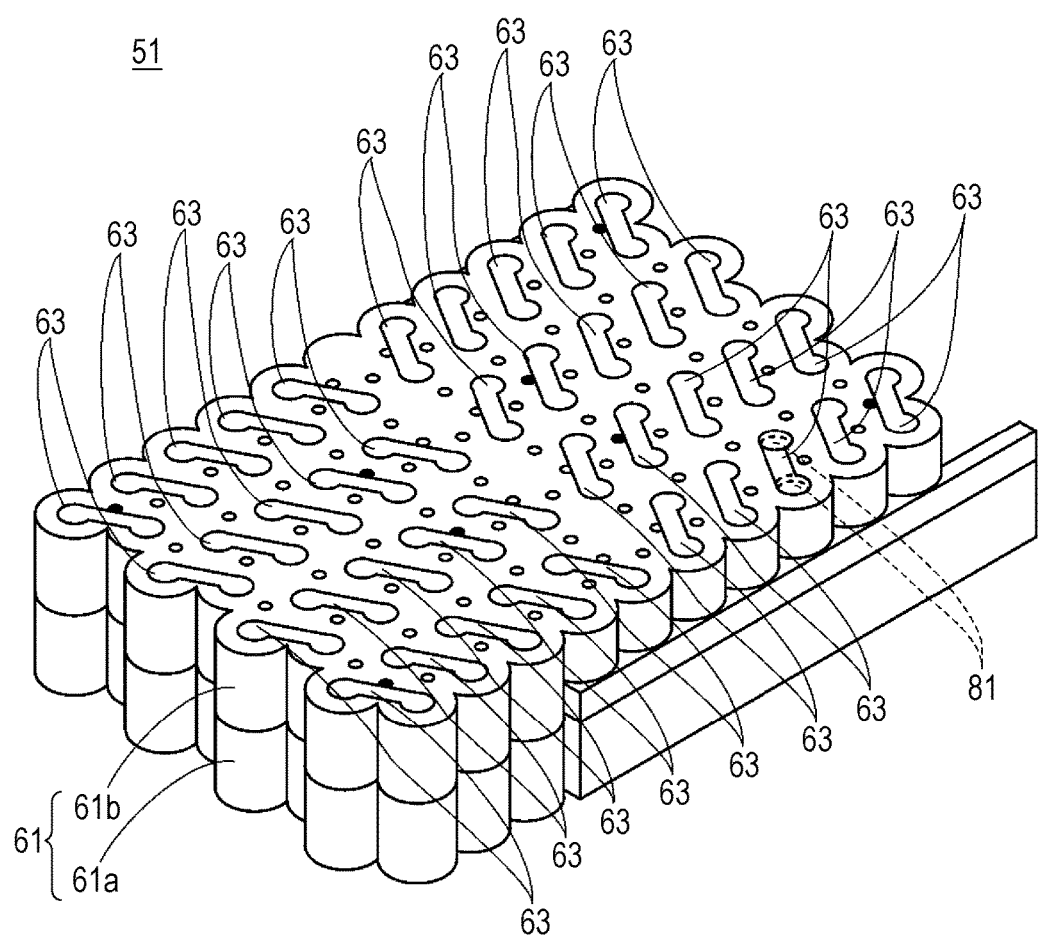
FIG. 24 is a perspective view of an example structure in which heat releasing rubbers are provided on the bottom casing.

For example, it is possible to use a structure in which the bottom casing 61b of the battery casing 61 has heat releasing rubbers 63 provided on the outer surface of the bottom surface portion. As shown in FIG. 24, each one heat releasing rubber 63 is designed to cover two openings 81 through which tabs are exposed, for example. The heat releasing rubbers 63 are made of a material that has excellent heat conductivity, excellent shock absorption properties, and heat resistance, such as silicon. Further, each heat releasing rubber 63 may have a structure (a stack structure, for example) formed with a combination of a heat conducting material having excellent heat conductivity and a shock absorbing material having a high heat resistance and excellent shock absorption properties. The heat releasing rubbers 63 face and are brought into contact with the side panels (the top panel and the bottom panel in the second embodiment) of the outer casing 20 facing the outer surface of the bottom surface portion of the bottom casing 61b. Accordingly, the conductivity of heat from the battery casing 61 to the outer casing 20 can be increased, and heat release properties can be further improved.

(Connection Forms of Battery Cells)

Connection forms of battery cells are not limited to the examples described in the first embodiment and the second embodiment. The partition plates 93a and 93b have such shapes as to be inserted between battery lines facing each other even in a case where each battery cell 10a is placed upside down to reverse the positions of the positive terminal surface and the negative terminal surface. That is, the same partition plates 93a and 93b can be used both in a case where each battery cell 10a has a positive terminal surface as the upper surface and a negative terminal surface as the lower surface, and in a case where each battery cell 10a has a positive terminal surface as the lower surface and a negative terminal surface as the upper surface. Accordingly, in a battery block group 10 housed in a battery unit, the positions of the positive terminal surface and the negative terminal surface of each battery cell 10a can be freely reversed, and connection forms of the battery cells can be readily changed.

For example, the positions of the positive terminal surface and the negative terminal surface of each battery cell 10a in a battery block group 10 can be reversed as in the first example and the second example described below.

First Example

Figure 25:
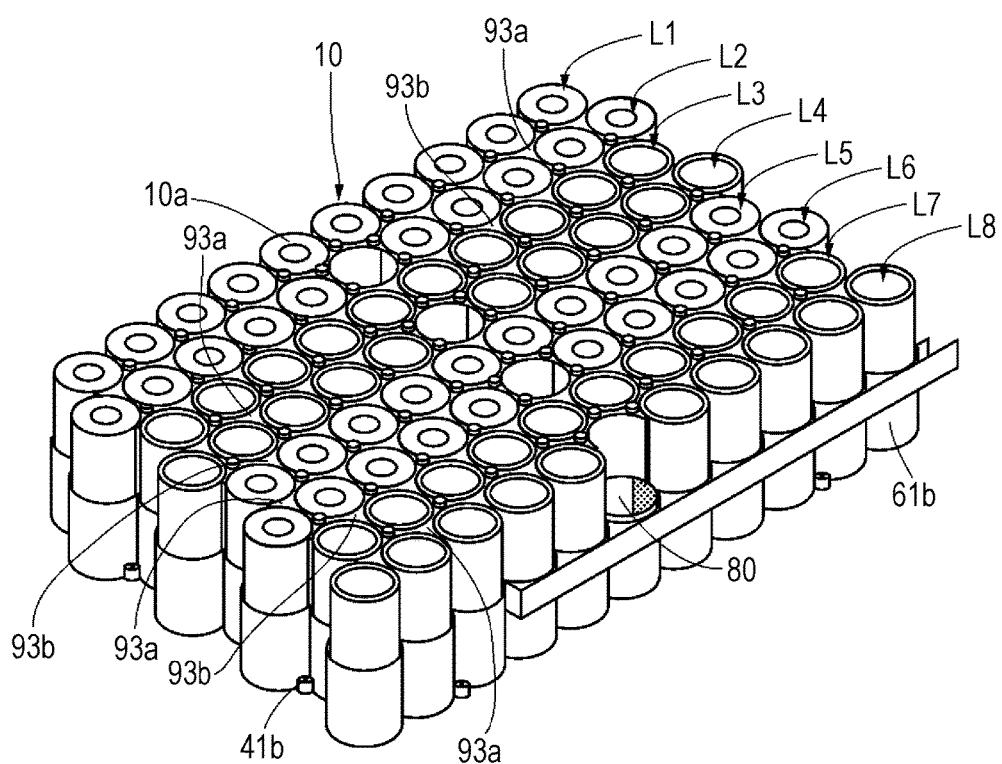
FIG. 25 is a perspective view of a battery unit minus its top casing, tabs, and positive insulating sheets.
Figure 26A:
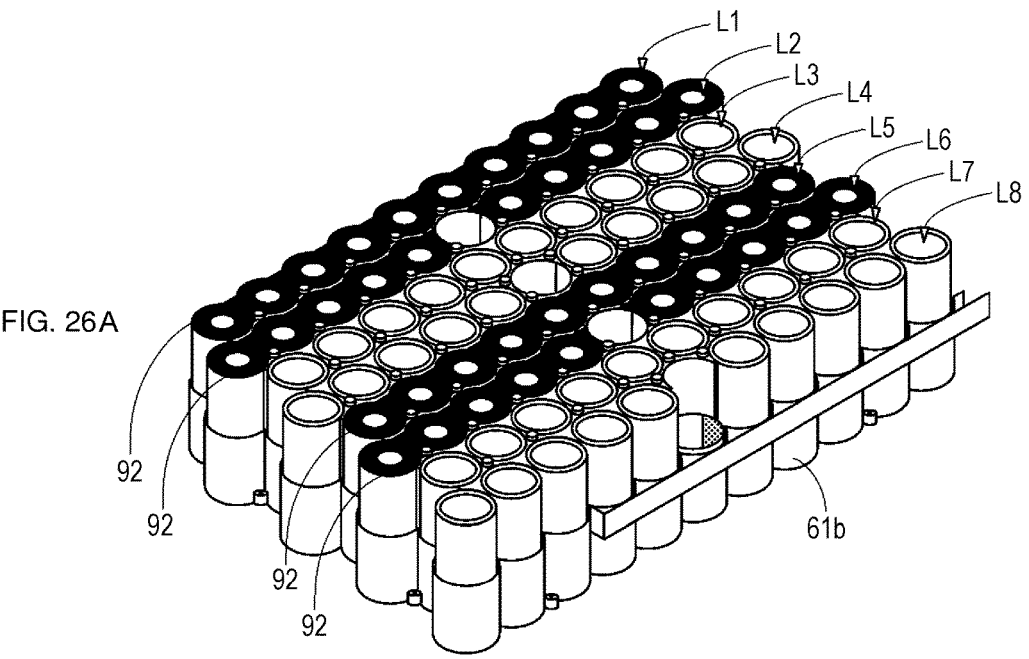
FIG. 26A is a perspective view of the battery unit minus its top casing and tabs.
Figure 26B:
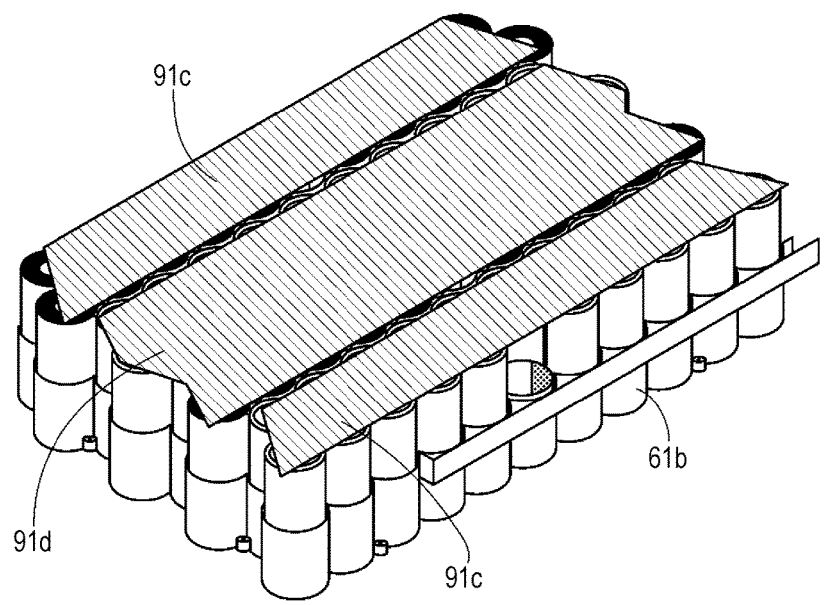
FIG. 26B is a perspective view of the battery unit minus its top casing.

FIG. 25 is a perspective view of a battery unit minus its top casing, tabs, and positive insulating sheets. FIG. 26A is a perspective view of the battery unit minus its top casing and tabs. FIG. 26B is a perspective view of the battery unit minus its top casing.

In a battery block group 10 housing in a battery casing 61, the battery line L1 and the battery line L2 are positioned to face each other, the battery line L2 and the battery line L3 are positioned to face each other, the battery line L3 and the battery line L4 are positioned to face each other, the battery line L4 and the battery line L6 are positioned to face each other, the battery line L5 and the battery line L6 are positioned to face each other, the battery line L6 and the battery line L7 are positioned to face each other, and the battery line L7 and the battery line L8 are positioned to face each other.

In the battery lines L1, L2, L5, and L6, the battery cells 10a constituting these battery lines each have a positive terminal surface as the upper surface and a negative terminal surface as the lower surface. In the battery lines L3, L4, L7, and L8, the battery cells 10a constituting these battery lines each have a negative terminal surface as the upper surface and a positive terminal surface as the lower surface.

As shown in FIG. 26A, positive insulating sheets 92 are placed on battery cell surfaces (the upper surfaces of the battery lines L1, L2, L5, and L6) serving as positive terminals. Although not shown in the drawings, positive insulating sheets 92 are also placed on battery cell surfaces (the lower surfaces of the battery lines L3, L4, L7, and L8) serving as positive terminals.

As shown in FIG. 26B, tabs 91c and 91d connecting the battery cells 10a are provided on the terminal surfaces of the battery cells 10a. On the terminal surfaces of the battery cells 10a, two tabs 91c and one tab 91d are arranged in parallel on the terminal surfaces of the battery cells 10a. Each tab 91c is electrically joined to the terminal surfaces of the battery cells 10a constituting two battery lines. The tab 91d is electrically joined to the terminal surfaces of the battery cells 10a constituting four battery lines adjacent to one another.

Although not shown in the drawings, the lower surfaces of the battery cells 10a are also joined by tabs. In the first example, the battery line L1 and the battery line L2 having battery cells 10a connected in parallel form a battery block B1, the battery line L3 and the battery line L4 having battery cells 10a connected in parallel form a battery block B2, the battery line L5 and the battery line L6 having battery cells 10a connected in parallel form a battery block B3, and the battery line L7 and the battery line L8 having battery cells 10a connected in parallel form a battery block B4. The battery blocks B1 through B4 are connected in series, to form the battery block group 10.

Second Example

Figure 27:
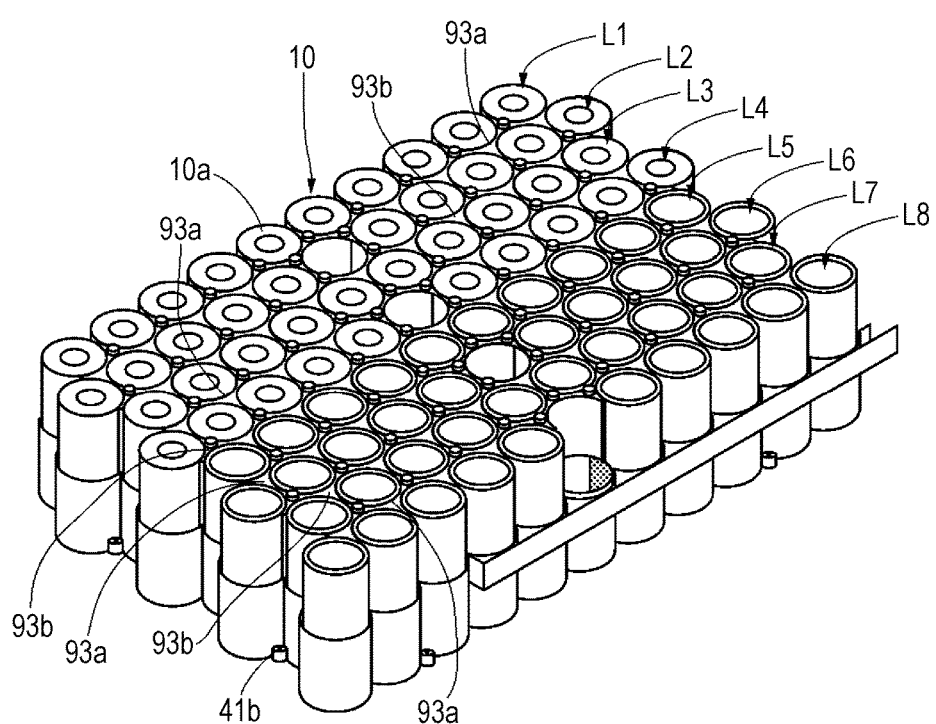
FIG. 27 is a perspective view of a battery unit minus its top casing, tabs, and positive insulating sheets.
Figure 28A:
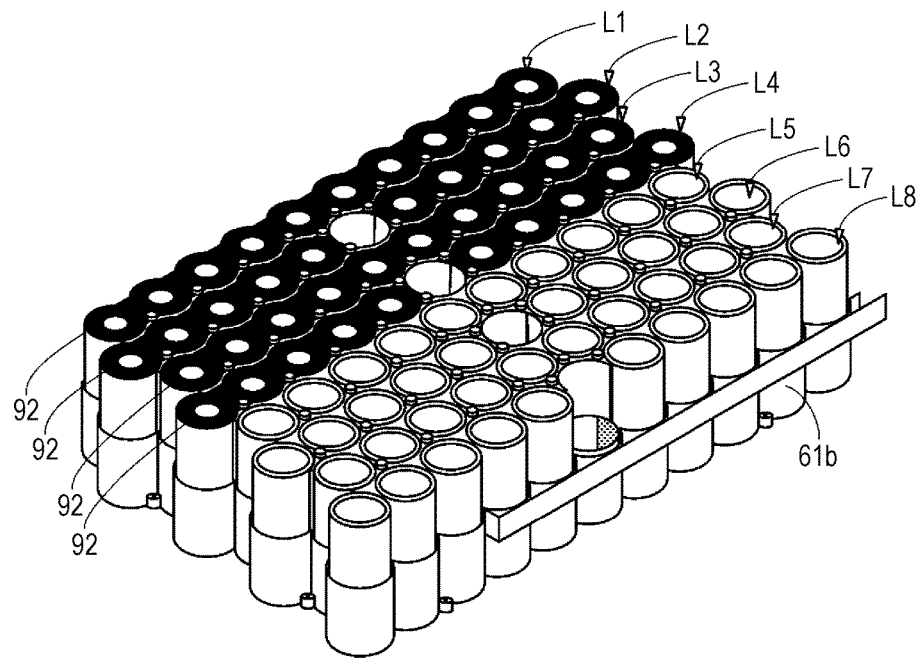
FIG. 28A is a perspective view of the battery unit minus its top casing and tabs.
Figure 28B:
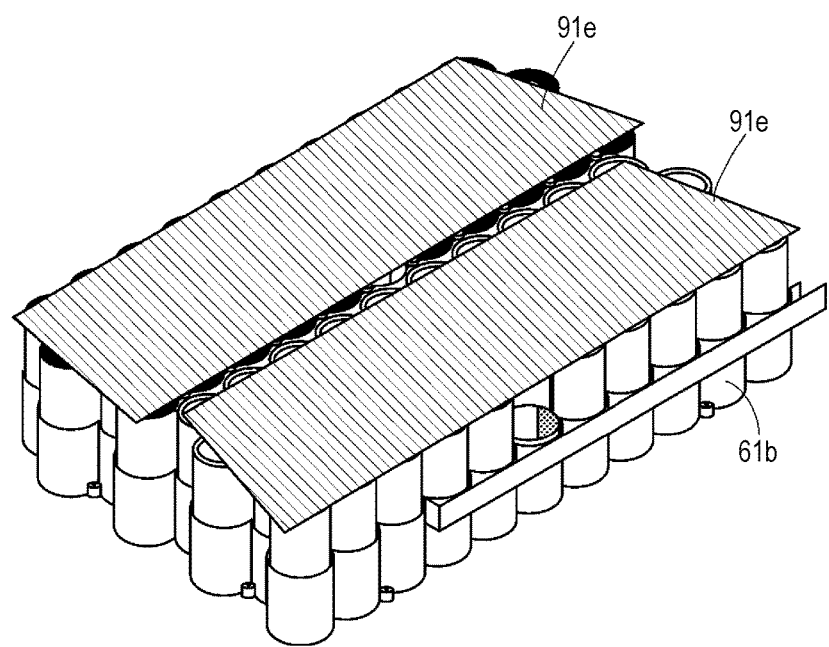
FIG. 28B is a perspective view of the battery unit minus its top casing.

FIG. 27 is a perspective view of a battery unit minus its top casing, tabs, and positive insulating sheets. FIG. 28A is a perspective view of the battery unit minus its top casing and tabs. FIG. 28B is a perspective view of the battery unit minus its top casing.

In a battery block group 10 housing in a battery casing 61, the battery line L1 and the battery line L2 are positioned to face each other, the battery line L2 and the battery line L3 are positioned to face each other, the battery line L3 and the battery line L4 are positioned to face each other, the battery line L4 and the battery line L6 are positioned to face each other, the battery line L5 and the battery line L6 are positioned to face each other, the battery line L6 and the battery line L7 are positioned to face each other, and the battery line L7 and the battery line L8 are positioned to face each other.

In the battery lines L1, L2, L3, and L4, the battery cells 10a constituting these battery lines each have a positive terminal surface as the upper surface and a negative terminal surface as the lower surface. In the battery lines L5, L6, L7, and L8, the battery cells 10a constituting these battery lines each have a negative terminal surface as the upper surface and a positive terminal surface as the lower surface.

As shown in FIG. 28A, positive insulating sheets 92 are placed on battery cell surfaces (the upper surfaces of the battery lines L1, L2, L3, and L4) serving as positive terminals. Although not shown in the drawings, positive insulating sheets 92 are also placed on the portions between battery cell surfaces (the lower surfaces of the battery lines L5, L6, L7, and L8) serving as positive terminals, and the tabs.

As shown in FIG. 28B, tabs 91e connecting the battery cells 10a are provided on the terminal surfaces of the battery cells 10a. On the terminal surfaces of the battery cells 10a, two tabs 91e are arranged in parallel on the terminal surfaces of the battery cells 10a. Each of the two tab 91e is electrically joined to the terminal surfaces of the battery cells 10a constituting four battery lines.

Although not shown in the drawings, the lower surfaces of the battery cells 10a are also joined by tabs. In the second example, the battery line L1, the battery line L2, the battery line L3, and the battery line L3, which have battery cells 10a connected in parallel, form a battery block B1, and the battery line L5, the battery line L6, the battery line L7, and the battery line L8, which have battery cells 10a connected in parallel, form a battery block B2. The battery blocks B1 and B2 are connected in series, to form the battery block group 10.

(Number of Battery Units)

In the above described first and second embodiments, the number of battery units housed in the outer casing 20 is two. However, the number of battery units housed in the outer casing 20 is not limited to two. For example, the number of battery units housed in the outer casing may be one, or may be three or greater. For example, a power storage device may be vertically housed in the outer casing 20 so that the bottom surface portion and the top surface portion of each top casing 61a face in the horizontal direction, and three or more battery units may be stacked in the horizontal direction. In this case, insulating members are provided between the battery units facing each other. Alternatively, a power storage device may be horizontally housed in the outer casing 20 so that the bottom surface portion and the top surface portion of each top casing 61a face in the vertical direction, and three or more battery units may be stacked in the horizontal direction.

Power storage devices according to the present technology may also be embodied in the structures described below.

[1]

A power storage device including:

an outer casing; and two or more battery units housed in the outer casing, the battery units each including:

a battery casing formed with a top casing having one or more first holes formed in a bottom surface portion thereof and a bottom casing having one or more second holes formed in a bottom surface portion thereof;

a battery block group housed in the battery casing, battery lines formed with battery cells arranged in lines are arranged in parallel in a direction substantially perpendicular to the extending direction of the battery lines, and are arranged like stacked straw bags; and a partition plate that is housed together with the battery block group in the battery casing, and is inserted between adjacent ones of the battery lines facing each other, one or more first protrusions being formed on an upper surface of the partition plate, one or more second protrusions being formed on a lower surface of the partition plate, the one or more first protrusions being engaged with the one or more first holes, the one or more second protrusions being engaged with the one or more second holes.

[2]

The power storage device of [1], wherein the two or more battery units are vertically housed in the outer casing and are stacked in two or more stages in a horizontal direction, the bottom surface portions facing in the horizontal direction.

[3]

The power storage device of [1] or [2], further including a joining member that is housed in the battery casing and is joined to all the terminal surfaces of the battery cells constituting at least one of the battery lines.

[4]

The power storage device of one of [1] through [3], further including a first board that is housed in the outer casing and is secured to one wall surface of the battery casing, a protruding end portion of the joining member being joined to the first board, the protruding end portion protruding in the battery line extending direction, a circuit including at least a voltage control circuit being mounted on the first board.

[5]

The power storage device of [4], further including a second board and a third board that are housed in the outer casing and are formed as structures independent of the first board, a circuit including at least a current breaking element being mounted on the second board, a circuit including at least an output terminal being mounted on the third board.

[6]

The power storage device of [5], wherein one or more third protrusions are formed on a first surface of the outer casing, one or more fourth protrusions are formed on a second surface of the outer casing, one or more third holes are further formed in the bottom surface portion of the bottom casing of one or more of the battery units facing the first surface, one or more third holes are further formed in the bottom surface portion of the bottom casing of one or more of the battery units facing the second surface, the one or more third protrusions are engaged with the one or more third holes, to secure the one or more of the battery units to the first surface, and the one or more fourth protrusions are engaged with the one or more fourth holes, to secure the one or more of the battery units to the second surface.

[7]

The power storage device of [5] or [6], wherein one or more fifth protrusions are further formed on the first surface, one or more sixth protrusions are further formed on the second surface, one or more fifth holes are formed in the second board, one or more sixth holes are formed in the third board, the one or more fifth protrusions are engaged with the one or more fifth holes, to further secure the second board to the first surface of the outer casing, and the one or more sixth protrusions are engaged with the one or more sixth holes, to further secure the third board to the second surface.

[8]

The power storage device of one of [5] through [7], wherein a board group including the first board, the second board, and the third board is housed in a space between one wall surface of the battery casing and a third surface of the outer casing, the third surface facing the one wall surface, and the boards in the board group are electrically connected by a plate-like connecting member.

[9]

The power storage device of one of [1] through [8], wherein the battery lines are formed with first battery lines and second battery lines alternately arranged in parallel in a direction substantially perpendicular to the extending direction of the battery lines, each of the first battery lines being formed with battery cells linearly arranged in a close contact state, each of the second battery lines having a space of the size of one battery cell, the space being located between two sets of battery cells linearly arranged in a close contact state, the top casing further includes a structural member inserted into the space of the size of one battery cell, and the bottom casing further includes another structural member inserted into the space of the size of one battery cell.

[10]

The power storage device of [9], wherein one or more seventh protrusions are formed on one surface of the outer casing, one or more seventh holes are formed in a surface of the another structural member, the surface of the another structural member facing the one surface of the outer casing, and the one or more seventh protrusions are engaged with the one or more seventh holes in the another structural member.

[11]

The power storage device of one of [2] through [10], further including an insulating member interposed between one bottom surface portion of the top casing of one of the two or more battery units and another bottom surface portion of the top casing of another one of the two or more battery units, the one of the two or more battery units facing the another one of the two or more battery units.

[12]

The power storage device of [11], wherein the insulating member includes a first resin plate placed on the one bottom surface portion and a second resin plate placed on the another bottom surface portion, the first resin plate and the second resin plate being in close contact with each other, the first resin plate has a protrusion and/or a recess in a surface in close contact with the second resin plate, the second resin plate has a protrusion and/or a recess in a surface in close contact with the first resin plate, the protrusion and/or the recess of the first resin plate is engaged with the protrusion and/or the recess of the second resin plate.

[13]

The power storage device of one of [1] through [12], wherein the top casing further has a hole for inserting a temperature detecting element into the battery casing.

[14]

The power storage device of [13], wherein the partition plate has a cut-away portion for maintaining a space accommodating the temperature detecting element, the hole being located below the hole in the vertical direction.

[15]

A power storage system in which the power storage device of one of [1] through [14] is charged by a power generating unit that generates electric power from renewable energy.

[16]

A power storage system including the power storage device of one of [1] through [14], the power storage system supplying electric power to an electronic apparatus connected to the power storage device.

[17]

An electronic apparatus that receives an electric power supply from the power storage device of one of [1] through [14].

[18]

An electric vehicle including:

a converter that receives an electric power supply from the power storage device of one of [1] through [14], and converts the electric power into vehicle drive power; and a control device that performs information processing related to vehicle control based on information about the power storage device.

[19]

An electric power system including a power information transmitting/receiving unit that transmits and receives signals to and from another device via a network, the electric power system performing charge/discharge control on the power storage device of one of [1] through [14] based on information received by the transmitting/receiving unit.

[20]

An electric power system that receives an electric power supply from the power storage device of one of [1] through [14], or supplies electric power from a power generating unit or a power network to the power storage device.

4. Applications

Applications of power storage devices will be described below. However, applications of power storage devices are not limited to the applications described below.

The present technology is a power storage system in which one of the above described power storage devices is charged by a power generating unit that generates power from renewable energy. The present technology is a power storage system that includes one of the above described power storage devices, and supplies electric power to an electronic apparatus connected to the power storage device. The present technology is an electronic apparatus that receives an electric power supply from one of the above described power storage devices. These electronic apparatuses and the electric power systems are embodied as residential power supply systems, for example. Further, they are embodied as systems that efficiently supply electric power in cooperation with an external power supply network. Further, the present technology is an electric vehicle that includes: a converter that receives an electric power supply from one of the above described power storage devices, and converts the electric power into vehicle drive power; and a control device that performs information processing related to vehicle control based on information about the power storage device. The present technology is an electric power system that includes a power information transmitting/receiving unit that transmits and receives a signal to and from another device via a network, and performs charge/discharge control on one of the above described power storage devices based on information received by the transmitting/receiving unit. The present technology is an electric power system that receives an electric power supply from one of the above described power storage device, or supplies electric power from a power generating unit or a power network to the power storage device.

[Power Storage System in a Residence as an Application]

Figure 29:
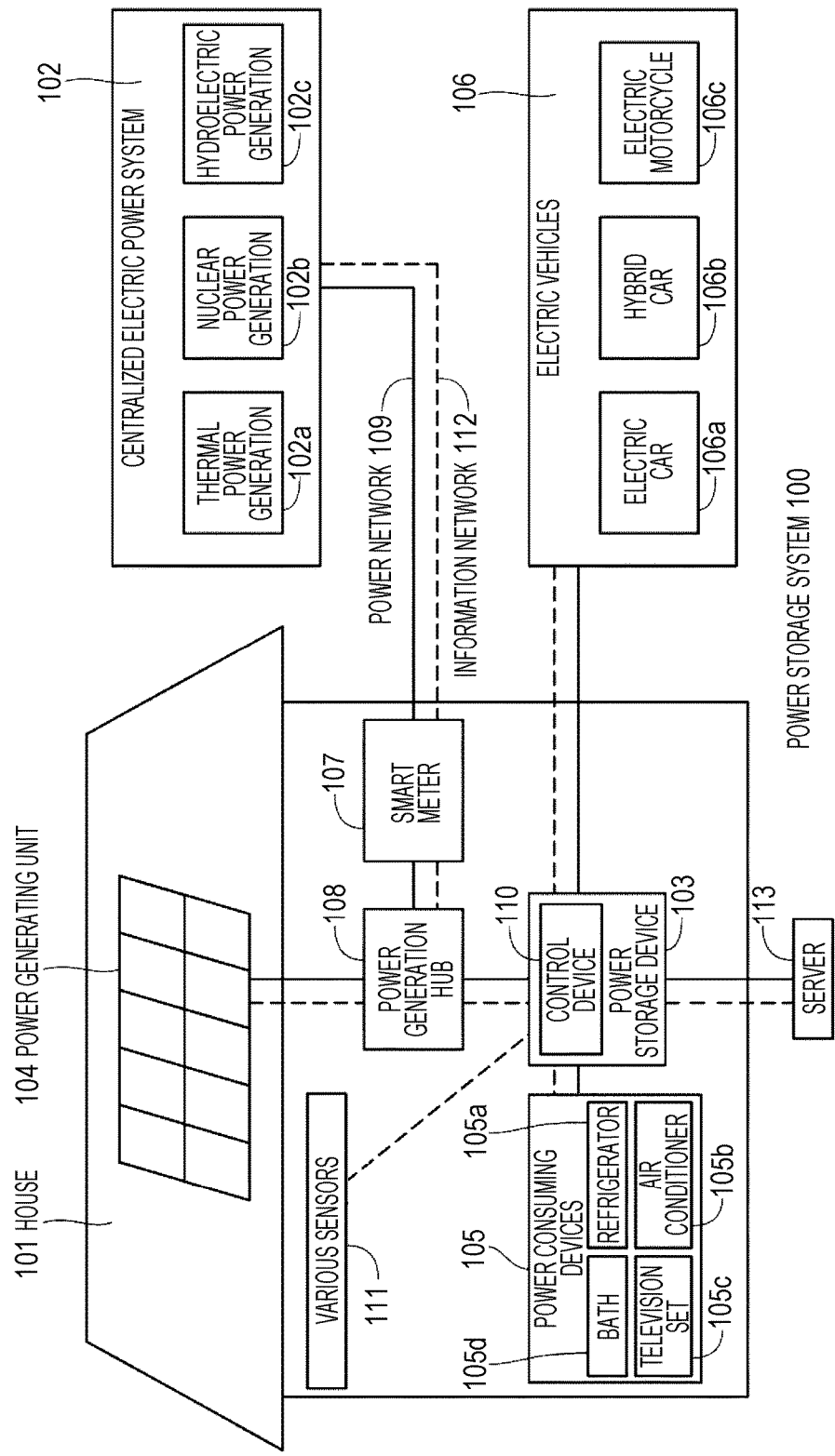
FIG. 29 is a block diagram for explaining an application of a power storage device of the present technology.

Referring now to FIG. 29, an example where the present technology is applied to a residential power storage system is described. In a power storage system 100 for a house 101, for example, electric power is supplied to a power storage device 103 from a centralized electric power system 102 such as thermal power generation 102a, nuclear power generation 102b, and hydroelectric power generation 102c, via a power network 109, an information network 112, a smart meter 107, a power generation hub 108, and the like. In conjunction with this, electric power from an independent power supply such as a power generating unit 104 is supplied to the power storage device 103. The supplied power is stored in the power storage device 103. With the power storage device 103, the electric power to be used in the house 101 is fed to the house 101. The same power storage system as above can be used not only in the house 101 but also in an office building.

The power generating unit 104, power consuming devices 105, the power storage device 103, a control device 110 that controls the respective devices, the smart meter 107, and sensors 111 that acquires various kinds of information are provided in the house 101. The respective devices are connected by the power network 109 and the information network 112. Solar cells, fuel cells, a windmill, or the like is used as the power generating unit 104, and generated electric power is supplied to the power consuming devices 105 and/or the power storage device 103. The power consuming devices 105 are a refrigerator 105a, an air conditioner 105b, a television receiver 105c, a bath 105d, and the like. The power consuming devices 105 further include electric vehicles 106. The electric vehicles 106 are an electric vehicle 106a, a hybrid car 106b, and an electric motorcycle 106c. The electric vehicles 106 may also include a power-assisted bicycle and the like.

The power storage device 103 is formed with secondary cells or capacitors. For example, the power storage device 103 is formed with lithium-ion secondary cells. The lithium-ion secondary cells may be of a stationary type, or may be used in the electric vehicles 106. The above described power storage device 1 of the present technology can be used as the power storage device 103. One or more power storage devices 1 can be used. The smart meter 107 has the function to detect commercial power usage, and transmit the detected usage to the electric power company. The power network 109 may be one of or a combination of a DC power supply, an AC power supply, and a non-contact power supply.

The various sensors 111 may be a motion sensor, an illuminance sensor, an object sensor, a power consumption sensor, a vibration sensor, a contact sensor, a temperature sensor, an infrared sensor, and the like. Information acquired by the various sensors 111 is transmitted to the control device 110. Weather conditions, the conditions of a person, and the like are determined from the information transmitted from the sensors 111, and the power consuming devices 105 can be automatically controlled so as to minimize energy consumption. Further, the control device 110 can transmit information about the house 101 to an external electric power company or the like via the Internet.

The power generation hub 108 performs processing such as power line branching or DC-AC conversion. The communication method used by the information network 112 connected to the control device 110 may be a method using a communication interface such as UART (Universal Asynchronous Receiver Transmitter), or a method using a sensor network compliant with wireless communication standards such as Bluetooth, ZigBee, or Wi-Fi. Bluetooth is used in multimedia communication, and enables point-to-multipoint communication. ZigBee uses physical layers of IEEE (Institute of Electrical and Electronics Engineers) 802.15.4. IEEE802.15.4 is the name of short-range wireless network standards called PAN (Personal Area Network) or W (Wireless) PAN.

The control device 110 is connected to an external server 113. This server 113 may be managed by the house 101, the electric power company, or the service provider. The information to be transmitted and received by the server 113 is power consumption information, life pattern information, electric power charges, weather information, natural hazard information, and information related to electricity trading, for example. These pieces of information may be transmitted and received by a power consuming device in the house (such as a television receiver), but may be transmitted and received by a device outside the house (such as a portable telephone device). These pieces of information may be displayed on a device having a display function, such as a television receiver, a portable telephone device, or a PDA (Personal Digital Assistant).

The control device 110 that controls the respective components is formed with a CPU (Central Processing Unit), a RAM (Random Access Memory), a ROM (Read Only Memory), and the like, and is included in the power storage device 103 in this example. The control device 110 is connected to the power storage device 103, the power generating unit 104, the power consuming devices 105, the various sensors 111, and the server 113 by the information network 112, and has the function to adjust electricity usage and power generation, for example. Other than that, the control device 110 may have the function to conduct electricity trading in the electricity market.

As described above, not only electric power generated from the centralized electric power system 102 such as the thermal power generation 102a, the nuclear power generation 102b, and the hydroelectric power generation 102c, but also electric power generated from the power generating unit 104 (solar power generation or wind power generation) can be stored in the power storage device 103. Accordingly, even when the electric power generated from the power generating unit 104 varies, control can be performed so that the amount of power to be sent out can be made constant, and only the necessary amount of power is discharged. For example, while electric power obtained through solar power generation is stored in the power storage device 103, less expensive night-time electric power is stored in the power storage device 103 at night, so that the electric power stored in the power storage device 103 can be discharged and used in expensive hours during the day.

Although the control device 110 is included in the power storage device 103 in the above described example, the control device 110 may be included in the smart meter 107 or may be formed as an independent device. Further, the power storage system 100 may be used in households in an apartment building, or may be used in detached houses.

[Power Storage System in a Vehicle as an Application]

Figure 30:
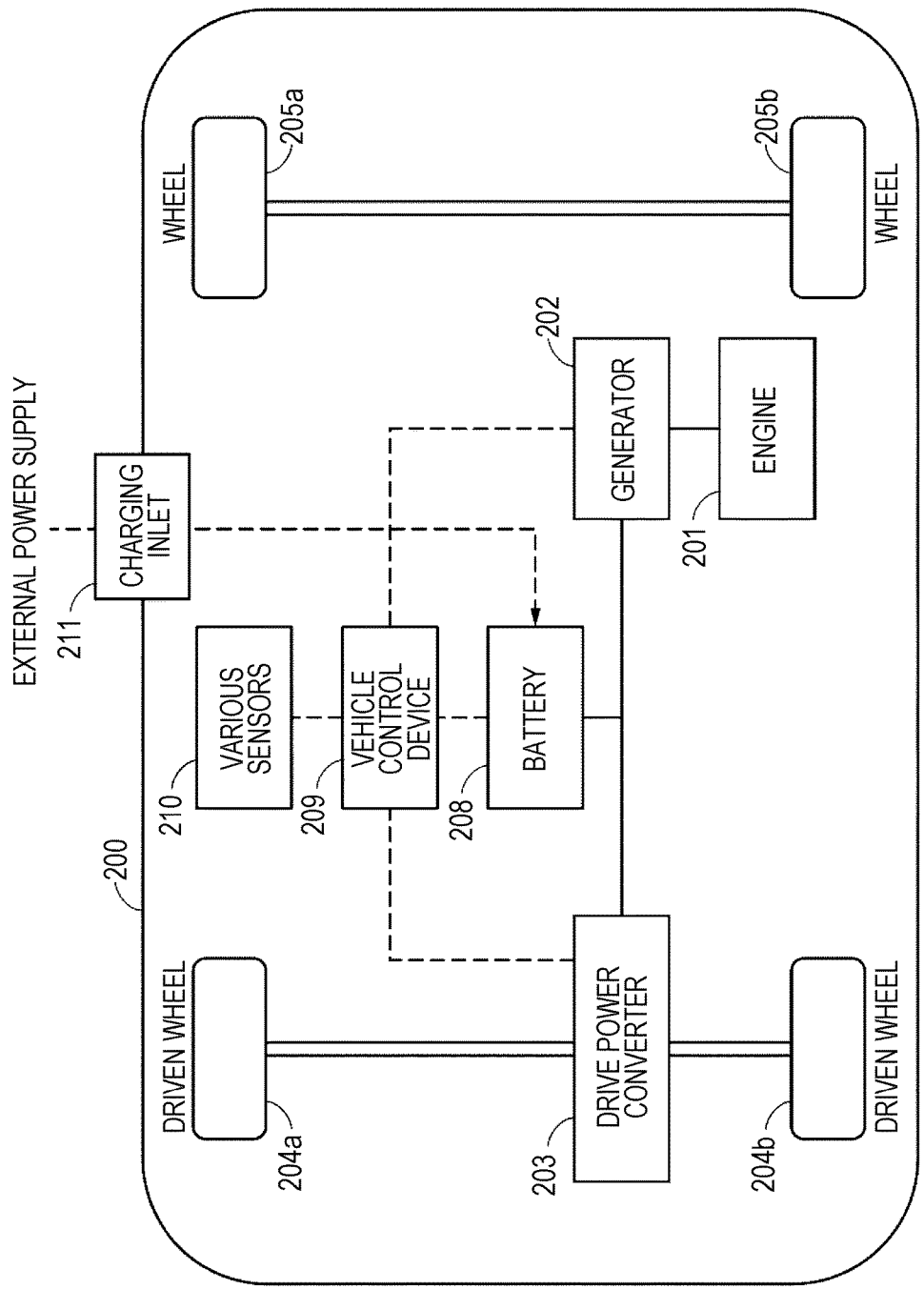
FIG. 30 is a block diagram for explaining an application of a power storage device of the present technology.

Referring now to FIG. 30, an example where the present technology is applied to a power storage system for vehicles is described. FIG. 30 schematically shows an example structure of a hybrid vehicle that uses a series hybrid system to which the present technology is applied. A series hybrid system is a car that is powered by a drive power converter, using electric power generated by a generator that is run by an engine or the electric power that is temporarily stored in a battery.

This hybrid vehicle 200 includes an engine 201, a generator 202, a drive power converter 203, a driven wheel 204a, a driven wheel 204b, a wheel 205a, a wheel 205b, a battery 208, a vehicle control device 209, various sensors 210, and a charging inlet 211. The above described power storage device 1 of the present technology is used as the battery 208. One or more power storage devices 1 are used.

The hybrid vehicle 200 runs with the drive power converter 203 serving as the power source. An example of the drive power converter 203 is a motor. The drive power converter 203 is activated by the power of the battery 208, and the rotative force of the drive power converter 203 is transferred to the driven wheels 204a and 204b. As DC-AC conversion or reverse conversion (AC-DC conversion) is performed at appropriate sites, either an AC motor or a DC motor can be used as the drive power converter 203. The various sensors 210 control the engine revolving speed via the vehicle control device 209, and control the opening (throttle position) of a throttle valve (not shown). The various sensors 210 include a velocity sensor, an acceleration sensor, an engine revolving speed sensor, and the like.

The rotative force of the engine 201 is transferred to the generator 202, and, by virtue of the rotative force, electric power generated by the generator 202 can be stored in the battery 208.

As the hybrid vehicle slows down with a braking mechanism (not shown), the resisting force during the deceleration is applied as rotative force to the drive power converter 203, and regenerative power generated from the rotative force by the drive power converter 203 is stored in the battery 208.

The battery 208 can be connected to a power supply outside the hybrid vehicle, so as to receive a power supply from the external power supply through the charging inlet 211 serving as a power inlet, and store the received electric power.

Although not shown in the drawing, an information processing device that performs information processing related to vehicle control based on information about the secondary cells may be provided. Such an information processing device may be an information processing device that indicates a remaining battery level based on information about the remaining battery level.

In the above description, a series hybrid car that is powered by a motor using electric power generated by a generator that is run by the engine or the electric power that is temporarily stored in the battery has been described as an example. However, the present technology can also be effectively applied to a parallel hybrid car that uses power outputs from both an engine and a motor serving as drive sources, and switches among three methods: being powered only by the engine, being powered only by the motor, being powered by both the engine and the motor. Furthermore, the present technology can also be effectively applied to a so-called electric vehicle that does not use an engine and is driven only by a drive motor.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A power storage device comprising:
an outer casing; and
two or more battery units housed in the outer casing,
the battery units each including:
a battery casing formed with a top casing having one or more first holes formed in a bottom surface portion thereof and a bottom casing having one or more second holes formed in a bottom surface portion thereof;
a battery block group housed in the battery casing, a plurality of battery lines each formed with a plurality of battery cells arranged in a line are arranged in parallel in a direction substantially perpendicular to an extending direction of the battery lines, and are arranged in a stacked straw bag arrangement; and
wherein the two or more battery units are vertically housed in the outer casing and are stacked in two or more stages in a horizontal direction, the bottom surface portions facing in the horizontal direction.

2. The power storage device according to claim 1, further comprising
a joining member housed in the battery casing and joined to all terminal surfaces of the battery cells constituting at least one of the battery lines.

3. The power storage device according to claim 2, further comprising
a first board housed in the outer casing and secured to one wall surface of the battery casing, a protruding end portion of the joining member being joined to the first board, the protruding end portion protruding in the battery line extending direction, a circuit including at least a voltage control circuit being mounted on the first board.

4. The power storage device according to claim 3, further comprising
a second board and a third board housed in the outer casing, the second board and the third board being formed as structures independent of the first board, a circuit including at least a current breaking element being mounted on the second board, a circuit including at least an output terminal being mounted on the third board.

5. The power storage device according to claim 4, wherein
one or more third protrusions are formed on a first surface of the outer casing,
one or more fourth protrusions are formed on a second surface of the outer casing,
one or more third holes are further formed in the bottom surface portion of the bottom casing of one or more of the battery units facing the first surface,
one or more third holes are further formed in the bottom surface portion of the bottom casing of one or more of the battery units facing the second surface,
the one or more third protrusions are engaged with the one or more third holes, to secure the one or more of the battery units to the first surface, and
the one or more fourth protrusions are engaged with the one or more fourth holes, to secure the one or more of the battery units to the second surface.

6. The power storage device according to claim 5, wherein
one or more fifth protrusions are further formed on the first surface,
one or more sixth protrusions are further formed on the second surface,
one or more fifth holes are formed in the second board,
one or more sixth holes are formed in the third board,
the one or more fifth protrusions are engaged with the one or more fifth holes, to further secure the second board to the first surface of the outer casing, and
the one or more sixth protrusions are engaged with the one or more sixth holes, to further secure the third board to the second surface.

7. The power storage device according to claim 6, wherein
a board group including the first board, the second board, and the third board is housed in a space between one wall surface of the battery casing and a third surface of the outer casing, the third surface facing the one wall surface, and
the first, second, and third boards in the board group are electrically connected by a plate-type connecting member.

8. The power storage device according to claim 1, wherein
the battery lines are formed with first battery lines and second battery lines alternately arranged in parallel in a direction substantially perpendicular to the extending direction of the battery lines, each of the first battery lines being formed with the battery cells linearly arranged in a close contact state, each of the second battery lines having a space of the size of one battery cell, the space being located between two sets of battery cells linearly arranged in a close contact state,
the top casing further includes a structural member inserted into the space of the size of one battery cell, and
the bottom casing further includes another structural member inserted into the space of the size of one battery cell.

9. The power storage device according to claim 8, wherein
one or more seventh protrusions are formed on one surface of the outer casing,
one or more seventh holes are formed in a surface of the another structural member, the surface of the another structural member facing the one surface of the outer casing, and
the one or more seventh protrusions are engaged with the one or more seventh holes in the another structural member.

10. The power storage device according to claim 1, further comprising
an insulating member interposed between one bottom surface portion of the top casing of one of the two or more battery units and another bottom surface portion of the top casing of another one of the two or more battery units, the one of the two or more battery units facing the another one of the two or more battery units.

11. The power storage device according to claim 10, wherein
the insulating member includes a first resin plate placed on the one bottom surface portion and a second resin plate placed on the another bottom surface portion, the first resin plate and the second resin plate being in close contact with each other,
the first resin plate has one or both of a protrusion and a recess in a surface in close contact with the second resin plate,
the second resin plate has one or both of a protrusion and a recess in a surface in close contact with the first resin plate,
one or both of the protrusion and the recess of the first resin plate is engaged with one or both of the protrusion and the recess of the second resin plate.

12. The power storage device according to claim 1, wherein the top casing further has a hole for inserting a temperature detecting element into the battery casing.

13. A power storage system comprising the power storage device of claim 1 in which the power storage device is charged by a power generating unit configured to generate electric power from renewable energy.

14. A power storage system comprising
the power storage device of claim 1,
the power storage system supplying electric power to an electronic apparatus connected to the power storage device.

15. An electronic apparatus receiving an electric power supply from the power storage device of claim 1.

16. An electric vehicle comprising:
a converter configured to receive an electric power supply from the power storage device of claim 1, and convert the electric power into vehicle drive power; and
a control device configured to perform information processing related to vehicle control based on information about the power storage device.

17. An electric power system comprising:
a power information transmitting/receiving unit configured to transmit and receive a signal to and from another device via a network,
the electric power system performing charge/discharge control on the power storage device of claim 1 based on information received by the transmitting/receiving unit.

18. An electric power system receiving an electric power supply from the power storage device of claim 1, or supplying electric power from a power generating unit or a power network to the power storage device.

* * * * *